(12) United States Patent
Yamamoto et al.

(10) Patent No.: US 7,100,016 B2
(45) Date of Patent: Aug. 29, 2006

(54) CONFIGURATION MANAGEMENT APPARATUS AND METHOD

(75) Inventors: Masayuki Yamamoto, Sagamihara (JP); Yasunori Kaneda, Sagamihara (JP); Yasuyuki Mimatsu, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 324 days.

(21) Appl. No.: 10/806,099

(22) Filed: Mar. 23, 2004

(65) Prior Publication Data

US 2005/0144414 A1 Jun. 30, 2005

(30) Foreign Application Priority Data

Dec. 24, 2003 (JP) .............................. 2003-426495

(51) Int. Cl.
*G06F 12/08* (2006.01)
(52) U.S. Cl. ........................... 711/170; 709/213; 711/6
(58) Field of Classification Search ..................... None
See application file for complete search history.

(56) References Cited

U.S. PATENT DOCUMENTS

| | | | |
|---|---|---|---|
| 5,051,887 A | 9/1991 | Berger et al. ............... | 711/162 |
| 5,784,703 A | 7/1998 | Muraoka et al. ............ | 711/173 |
| 6,289,423 B1 | 9/2001 | Ozaki et al. ................ | 711/163 |
| 6,775,739 B1 | 8/2004 | Bachmat et al. ............ | 711/114 |
| 2002/0138705 A1 | 9/2002 | Suzuki et al. ............... | 711/162 |
| 2003/0221063 A1 | 11/2003 | Eguchi et al. .............. | 711/114 |
| 2004/0024977 A1 | 2/2004 | Delaney et al. ............. | 711/154 |
| 2004/0123029 A1 | 6/2004 | Dalal et al. ................. | 711/114 |
| 2004/0193797 A1 | 9/2004 | Krehbiel, Jr. et al. ....... | 711/114 |
| 2005/0021908 A1 | 1/2005 | Ohno et al. ................. | 711/114 |
| 2005/0114693 A1 | 5/2005 | Mimatsu et al. ............. | 726/26 |

FOREIGN PATENT DOCUMENTS

| | | |
|---|---|---|
| GB | 2351375 | 12/2000 |
| WO | 9709676 | 3/1997 |

*Primary Examiner*—Gary Portka
(74) *Attorney, Agent, or Firm*—Mattingly, Stanger, Malur & Brundidge, P.C.

(57) ABSTRACT

To migrate a configuration that an old storage device has to a new storage device.

A new storage device 4000 obtains a configuration of an old storage device 5000, by using a migration manager PG 4345, and prepares a logical volume definition of the new storage device 4000 on the basis of a logical volume definition which is included in the configuration. Also, on the basis of a cache allocation definition included in the configuration of the old storage device 5000 and cache capacity of the new storage device 4000, a cache allocation definition of the new storage device 4000 is prepared. Also, on the basis of a port bandwidth allocation definition included in the configuration of the old storage device 5000 and bandwidth capacity of a port of the new storage device 4000, a port bandwidth allocation definition of the new storage device 4000 is prepared. And, the logical volume definition, the cache allocation definition and the port bandwidth allocation definition which were prepared as above are set up in a configuration of the new storage device 4000.

10 Claims, 17 Drawing Sheets

FIG.6

PORT MANAGEMENT TL 4315, 5315

| PORT ID | PORT WWN WWN | SCSI ID | BANDWIDTH CAPACITY | BANDWIDTH REMAINING CAPACITY |
|---|---|---|---|---|
| port-b1 | WWNb1 | 2 | 200MB/s | 50MB/s |
| port-b2 | WWNb2 | 3 | 200MB/s | 200MB/s |
| port-b3 | WWNb3 | 4 | 100MB/s | 50MB/s |
| port-b4 | WWNb4 | 4 | 200MB/s | 200MB/s |
| : | : | : | : | : |

CACHE MANAGEMENT TL 4320, 5320

| CACHE TOTAL CAPACITY | CACHE REMAINING CAPACITY |
|---|---|
| 10GB | 7.5GB |

LOGICAL VOLUME MANAGEMENT TL 4325, 5325

| LOGICAL VOLUME ID | PATH ID LIST | VOLUME CAPACITY | DATA ARRANGEMENT |
|---|---|---|---|
| vb1 | path-b1, path-b3 | 10GB | PARITY GROUP 0 |
| vb2 | path-b2 | 20GB | PARITY GROUP 1 |
| vb3 | path-b4 | 30GB | PARITY GROUP 2 |

PATH MANAGEMENT TL 4330,5330

| PATH ID | PORT ID | LUN | LOGICAL VOLUME ID |
|---------|---------|-----|-------------------|
| path -b1 | port -b1 | 1 | vb1 |
| path -b2 | port -b1 | 2 | vb2 |
| path -b3 | port -b3 | 1 | vb1 |
| path -b4 | port -b3 | 2 | vb3 |

FIG.10

CACHE ALLOCATION MANAGEMENT TL 4335,5335

| LOGICAL VOLUME ID | CACHE ALLOCATION AMOUNT | CACHE RESIDENT AREA |
|-------------------|-------------------------|----------------------|
| vb1 | 1GB | 300MB (ADDRESS 0 -153600) |
| vb2 | NO | 500MB (ADDRESS 0 -256000) |
| vb3 | 1GB | NO |

FIG.11

PORT BANDWIDTH ALLOCATION MANAGEMENT TL 4340,5340

| PATH ID | PORT ID | ALLOCATION BANDWIDTH |
|---------|---------|----------------------|
| path -b1 | port -b1 | 100MB /s |
| path -b2 | port -b1 | 50MB /s |
| path -b3 | port -b3 | 50MB /s |

FIG.12

DEVICE DETECTION LIST 4350

| DETECTION OBJECT ID (43501) | DEVICE TYPE (433502) | DEVICE INFORMATION (43503) | IP ADDRESS (43504) |
|---|---|---|---|
| vb1 | STORAGE | VENDOR | 100.100.100.103 |

FIG.13

CACHE ALLOCATION MIGRATION TL 4355

| PROCESSED FLAG (43551) | MIGRATION SOURCE CACHE DEFINITION | | | MIGRATION DESTINATION CACHE DEFINITION | | |
|---|---|---|---|---|---|---|
| | LOGICAL VOLUME ID (43552) | CACHE ALLOCATION AMOUNT (43558) | CACHE RESIDENT AREA (43553) | LOGICAL VOLUME ID (43554) | CACHE ALLOCATION AMOUNT (43555/43559) | CACHE RESIDENT AREA (43556/43557) |
| DONE | vb1 | 1GB | 300MB | va1 | 1GB | 300MB |
| YET | vb2 | | 500MB | - | - | - |
| YET | vb3 | 1GB | NO | - | - | - |

FIG.14

MIGRATION DESTINATION CACHE REMAINING CAPACITY MANAGEMENT TL 4360

| MIGRATION DESTINATION CACHE REMAINING CAPACITY |
|---|
| 9GB |

FIG.15

PORT BANDWIDTH ALLOCATION MIGRATION TL 4365

| PROCESSED FLAG | MIGRATION SOURCE PORT DEFINITION ||| MIGRATION DESTINATION PORT DEFINITION |||
|---|---|---|---|---|---|---|
| | PATH ID | PORT ID | ALLOCATION BANDWIDTH | PATH ID | PORT ID | ALLOCATION BANDWIDTH |
| DONE | path-b1 | port-b1 | 100MB/s | path-a1 | port-a1 | 100MB/s |
| DONE | path-b2 | port-b1 | 50MB/s | path-a2 | port-a1 | 50MB/s |
| DONE | path-b3 | port-b3 | 50MB/s | path-a3 | port-a3 | 50MB/s |

FIG.16

PATH MIGRATION TL 4370

| PROCESSED FLAG | MIGRATION SOURCE PATH DEFINITION |||| MIGRATION DESTINATION PATH DEFINITION ||||
|---|---|---|---|---|---|---|---|---|
| | PATH ID | PORT ID | LUN | LOGICAL VOLUME ID | PATH ID | PORT ID | LUN | LOGICAL VOLUME ID |
| DONE | path-b1 | port-b1 | 1 | vb1 | path-a1 | port-a1 | 1 | va1 |
| DONE | path-b2 | port-b1 | 2 | vb2 | path-a2 | port-a1 | 2 | va2 |
| DONE | path-b3 | port-b3 | 1 | vb1 | path-a3 | port-a3 | 1 | va1 |
| YET | path-b4 | port-b3 | 2 | vb3 | - | - | - | - |

FIG.17

MIGRATION DESTINATION PORT BANDWIDTH
REMAINING CAPACITY MANAGEMENT TL 4375

| PORT ID (43751) | PORT BANDWIDTH REMAINING CAPACITY (43752) |
|---|---|
| port-a1 | 50MB/s |
| port-a2 | 200MB/s |
| port-a3 | 50MB/s |
| port-a4 | 200MB/s |

CONFIGURATION MANAGEMENT APPARATUS AND METHOD

BACKGROUND OF THE INVENTION

The present invention relates to a technology which manages a configuration such as cache allocation, port bandwidth management and so on in a storage device.

As a mode which implements a new storage device in a computer system which has a server (host) and a storage device, there are an implementation mode which migrates all data in an old storage device to the new storage device and removes the old storage device, and an implementation mode which adds the new storage device with leaving over the old storage device and consolidates a storage area of the old storage device with the new storage device by a virtual volume.

As the former implementation mode, there is a data migration technology described in WO97/09676 (hereinafter, referred to as Patent Document 1). In this technology, a new storage device and an old storage device are connected, and a data migration process is carried out during operation of a system, and thereby, down time of the system for the data migration work is shortened. Concretely, a host computer and the new storage device are connected, and furthermore, the new storage device and the old storage device are connected. The new storage device copies data in an old storage device to its own storage area, The new storage device accepts an access request to data from the host computer even in a copy working state, and if the data exists in an own storage area, the data is accessed. In case that it does not exist in the own storage area, the data is firstly copied from the old storage device, and then, accessed. By such operation of the new storage device, it becomes possible to continuously operate the system even in a data migration working state.

Also, as the latter mode, there is a virtual volume technology described in United Kingdom Patent Laid-Open Publication No. 2351375 specification (hereinafter, referred to as Patent Document 2). In this technology, by a storage server having the following two functions, volumes assigned to a host are consolidated by virtual volumes. Function 1; a function which manages storage areas of each storage device which was connected to the storage server, and generates a volume pool. Function 2: a function which generates virtual volumes on the basis of one or more storage areas in the volume pool, and redirects I/O accesses to the virtual volumes from the host to corresponding storage areas, and responds to an I/O access from the host. Hereinafter, the storage server having such functions is referred to as a virtualization device.

SUMMARY OF THE INVENTION

The technology described in Patent Document 1 relates to data migration from the old storage device to the new storage device, and does not consider to take over a configuration in the old storage device, to the new storage device. Usually, in the old storage device, a configuration used for volume access performance improvement such as cache allocation, port bandwidth allocation management, is set up by a system administrator at the time of construction of a computer system. In case that these setups are not taken over to the new storage device, there may occur such a matter that an access performance of a volume of the new storage device after migration is lowered than that of a volume of the old storage device.

Similarly, the technology described in Patent Document 2, does not consider to take over a configuration set in the old storage device to the virtualization device. Incase that a configuration of the old storage device is not taken over to the virtualization device, there may occur such a matter that an access performance of a virtual volume provided by the virtualization device is lowered than an access performance in case of directly accessing to a volume of the old storage device which corresponds to the virtual volume. On one hand, when the virtualization device takes over a configuration of the old storage-device, a resource such as cache of the virtualization device is consumed in large amounts on behalf of the old storage device, and there may occur such a matter that a resource assigned to another new storage device comes short.

The present invention takes the above-described circumstance into consideration, and the purpose of the present invention is to provide the technology which migrates a configuration of an old storage device to a new storage device.

Also, another purpose of the present invention is to provide the technology which migrates a configuration of an old storage device to a virtual volume provided by a virtualization device, in consideration of a resource such as cache etc. of the virtualization device.

In order to solve the above-described problems, the present invention collects a configuration managed in a first storage device (an old storage device), and has it reflected to a second storage device (a new storage device) which is a migration destination of a logical volume of the first storage device or a virtualization device which manages the logical volume of the first storage device by a virtual volume which is a virtual logical volume.

For example, one aspect of a configuration management method of the present invention, in a computer system having a first storage device, a second storage device which becomes a migration destination of a logical volume of the first storage device, and a server which can transmits an access request to the first and second storage devices through a network sets up a configuration in the second storage device.

And, the configuration management method has a first step which obtains a configuration including logical volume definition set up in the first storage device, a second step which prepares logical volume definition of a logical volume of the second storage device which becomes a migration destination of the logical volume of the first storage device, on the basis of logical volume definition which is included in the configuration obtained in the first step, in case that the cache allocation definition is included in the configuration obtained in the first step, a third step which prepares cache allocation definition of the logical volume of the second storage device which becomes a migration destination of the logical volume of the first storage device on the basis of the cache allocation definition of the first storage device and capacity of a cache of the second storage device in case that the port bandwidth allocation definition is included in the configuration obtained in the first step, a fourth step which prepares port bandwidth allocation definition of a port of the second storage device, which is used for an access to the logical volume of the second storage device which becomes a migration destination of the logical volume of the first storage device, on the basis of the port bandwidth allocation definition of the first storage device and bandwidth capacity of a port of the second storage device, and a fifth step which sets up, as a configuration in the second storage device, the logical volume definition prepared in the second step, the cache allocation definition in case that the cache allocation definition is prepared in the third step, and the port bandwidth allocation definition in case that the port bandwidth allocation definition is prepared in the fourth step.

Also, another aspect of the configuration management method of the present invention, in a computer system having a first storage device, a virtualization device which manages the logical volume of the first storage device by a virtual volume which is a virtual logical volume, and a server which can transmits an access request to the first storage devices and the virtualization device through a network, sets up a configuration in the virtualization device.

And, the configuration management method has a first step which obtains a configuration including logical volume definition set up in the first storage device, a second step which prepares logical volume definition of the virtual volume of the virtualization device which realizes virtualization of the logical volume of the first storage device, on the basis of logical volume definition which is included in the configuration obtained in the first step, in case that the cache allocation definition is included in the configuration obtained in the first step, a third step which prepares cache allocation definition of the virtual volume of the virtualization device which realizes virtualization of the logical volume of the first storage device, on the basis of the cache allocation definition of the first storage device and capacity of a cache of the virtualization device, in case that the port bandwidth allocation definition is included in the configuration obtained in the first step, a fourth step which prepares port bandwidth allocation definition of a port that the virtualization device has, which is used for an access to the virtual volume of the virtualization device which realizes virtualization of the logical volume of the first storage device, on the basis of the port bandwidth allocation definition of the first storage device and bandwidth capacity of a port of the virtualization device, and a fifth step which sets up, as a configuration in the virtualization device, the logical volume definition prepared in the second step, the cache allocation definition in case that the cache allocation definition is prepared in the third step, and the port bandwidth allocation definition in case that the port bandwidth allocation definition is prepared in the fourth step.

Here, in the above-described each aspect, the third step may prepare the cache allocation definition of the virtual volume of the second storage device or the virtualization device, in such a manner that a cache allocation amount of the logical volume of the second storage device which is a migration destination of the logical volume of the first storage device or the virtual volume of the virtualization device which realizes virtualization of the logical volume of the first storage device becomes the same capacity as a cache allocation amount of the logical volume of the first storage device, in case that the cache allocation amount of the logical volume of the first storage device, which is specified by the cache allocation definition included in the configuration obtained in the first step, is smaller than remaining capacity to which the logical volume is not allocated out of total capacity of the cache of the second storage device or the virtualization device.

Also, the fourth step may prepare the port bandwidth allocation definition of a port of the second storage device or the virtualization device, which is used for an access to the logical volume of the second storage device which is a migration destination of the logical volume of the first storage device or the virtual volume of the virtualization device which realizes virtualization of the logical volume of the first storage device, in such a manner that a port bandwidth allocation amount, which is used for an access to the logical volume of the second storage device which is a migration destination of the logical volume of the first storage device or the logical volume of the virtualization device which realizes virtualization of the logical volume of the first storage device, becomes the same capacity as a port bandwidth allocation amount which is used for an access to the logical volume of the first storage device, in case that the port bandwidth allocation amount used for an access to the logical volume of the first storage device, which is specified by the port bandwidth allocation definition which is included in the configuration obtained in the first step, is smaller than remaining bandwidth capacity which is not allocated to an access to the logical volume, out of total bandwidth capacity of a port of the second storage device or the virtualization device.

According to the present invention, the configuration of the old storage, such as cache allocation, port bandwidth allocation management and so on, is set up in the new storage device or the virtualization device. On this account, it becomes possible to have various setups for volume access performance improvement applied to the old storage device validated even after a configuration of a computer system is changed.

In addition, other features of the present invention will be clarified by descriptions of this specification and accompanying drawings.

BRIEF DESCRIPTION OF THE DRAWINGS

FIG. 6 is a view for explaining configurations of port management TLs 4315 and 5315.

FIG. 7 is a view for explaining configurations of cache management TLs 4320 and 5320.

FIG. 8 is a view for explaining configurations of logical volume management TLs 4325 and 5325.

FIG. 9 is a view for explaining configurations of path management TLs 4330 and 5330.

FIG. 10 is a view for explaining configurations of cache allocation management TLs 4335 and 5335.

FIG. 11 is a view for explaining configurations of port bandwidth allocation management TLs 4340 and 5340.

FIG. 12 is a view for explaining a configuration of a device detection list 4350.

FIG. 13 is a view for explaining a configuration of a cache allocation migration TL 4355.

FIG. 14 is a view for explaining a configuration of a migration destination cache remaining capacity management TL 4360.

FIG. 15 is a view for explaining a configuration of a port bandwidth migration TL 4365.

FIG. 16 is a view for explaining a configuration of a path migration TL 4370.

FIG. 17 is a view for explaining a configuration of a migration destination port bandwidth remaining capacity management TL 4375.

DESCRIPTION OF THE PREFERRED EMBODIMENT

Hereinafter, computer systems to which embodiments of the present invention are applied will be described.

First Embodiment

A computer system of a first embodiment of the present invention will be described by way of taking such a case, as an example, that a storage area network between a host and a storage device is built up on a Fibre Channel network.

(1) System Configuration

Figure 1:
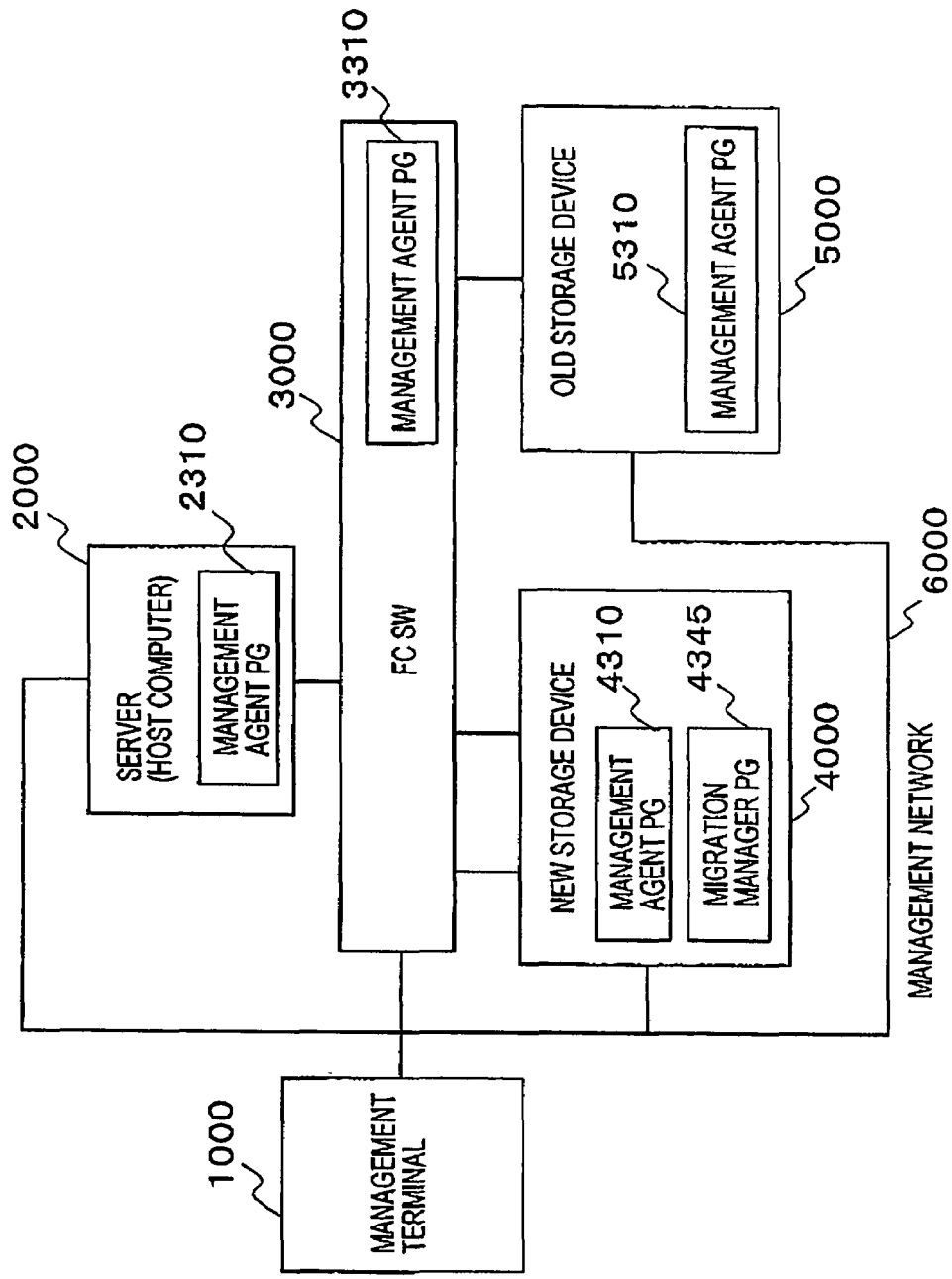
FIG. 1 is a schematic diagram of a computer system to which a first embodiment of the present invention is applied.

FIG. 1 is a schematic diagram of the computer system to which the first embodiment of the present invention is applied.

As shown in the figure, the computer system of this embodiment is configured such that a management terminal 1000, a Fibre Channel switch (FC SW) 3000 which configures a storage area network, an existing old storage device 5000, a new storage device 4000 to be newly implemented, and a server 2000 which is a host computer are mutually connected by a management network 6000 such as Ethernet (trademark) and so on.

The server 2000, the FC SW 3000, the new storage device 4000, and the old storage device 5000 have, management agent PG (program) 2310, 3310, 4310, 5310, respectively.

The new storage device 4000 further has a migration manager PG 4345. By this migration manager PG 4345, the new storage device 4000 obtains a configuration such as port bandwidth allocation, cache allocation and so on, from each device 2000, 3000, 4000, 5000 executing the management agent PG 2310, 3310, 4310, 5310, and carries out a migration process which will be described later. In addition, the migration manager PG 4345 may be possessed by the old storage device 5000. Also, the configuration may be obtained through the storage area network.

The management terminal 1000 is a terminal used for an administrator etc. of a computer system to input various instructions for the migration manager PG 4345, and to inform execution results of the migration manager PG 4345 and the management agent PGs 2310, 3310, 4310, 5310 to a system administrator etc. of the computer system.

Figure 2:
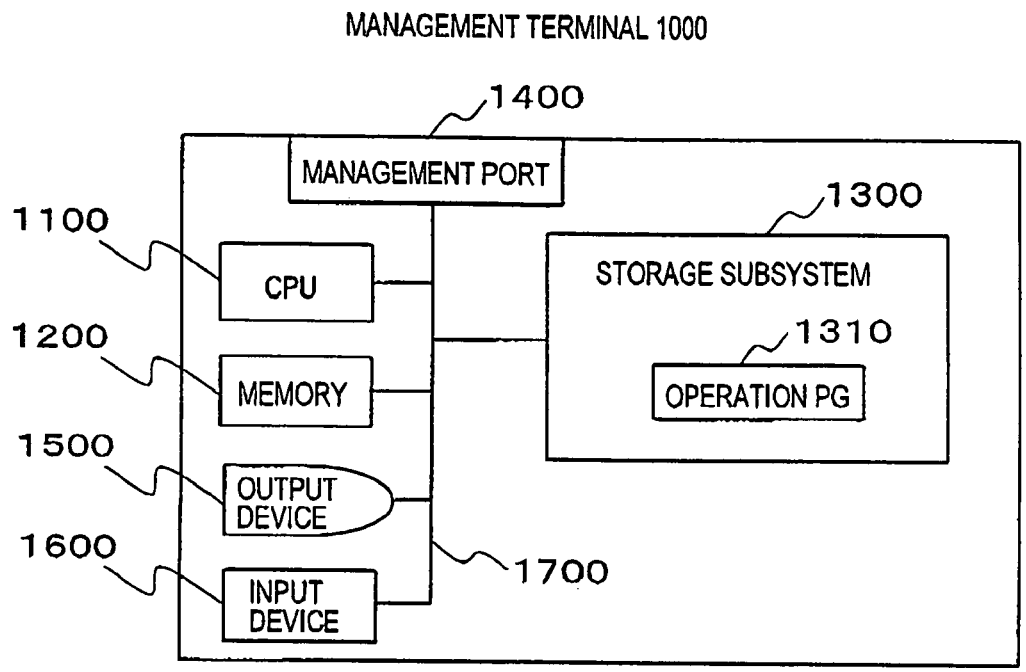
FIG. 2 is a schematic diagram of a management terminal 1000 shown in FIG. 1.

FIG. 2 is a schematic diagram of the management terminal 1000 shown in FIG. 1.

As shown in the figure, the management terminal 1000 has a CPU 1100, a memory 1200, a storage subsystem 1300, a management port 1400 used for connecting to a management network 6000, an output device 1500 such as display, an input device 1600 such as a keyboard, and a bus 1700 which connects these respective devices mutually. In the storage subsystem 1300, an operation PG 1310 is stored. The CPU 1100 loads the operation PG 1310 to the memory 1200 and executes it, and thereby, accepts various instructions for the migration manager PG 4345 from an administrator etc. of a computer system through the input device 1600, and transmits them from the management port 1400. Also, through the management port 1400, the CPU 100 receives execution results of the migration manager PG 4345 and the management agent PGs 2310, 3310, 4310, 5310, and outputs them to the output device 1500.

The server 2000 communicates with the storage devices 4000, 5000 by using a communication program defined on a Fibre Channel protocol that the Fibre Channel network adopts, for example, a standard SCSI protocol. By this, data stored in the storage devices 4000, 5000 is read and written. In addition, in FIG. 1, one unit of the server 2000 is shown, but the number of servers 2000 may be plural.

Figure 3:
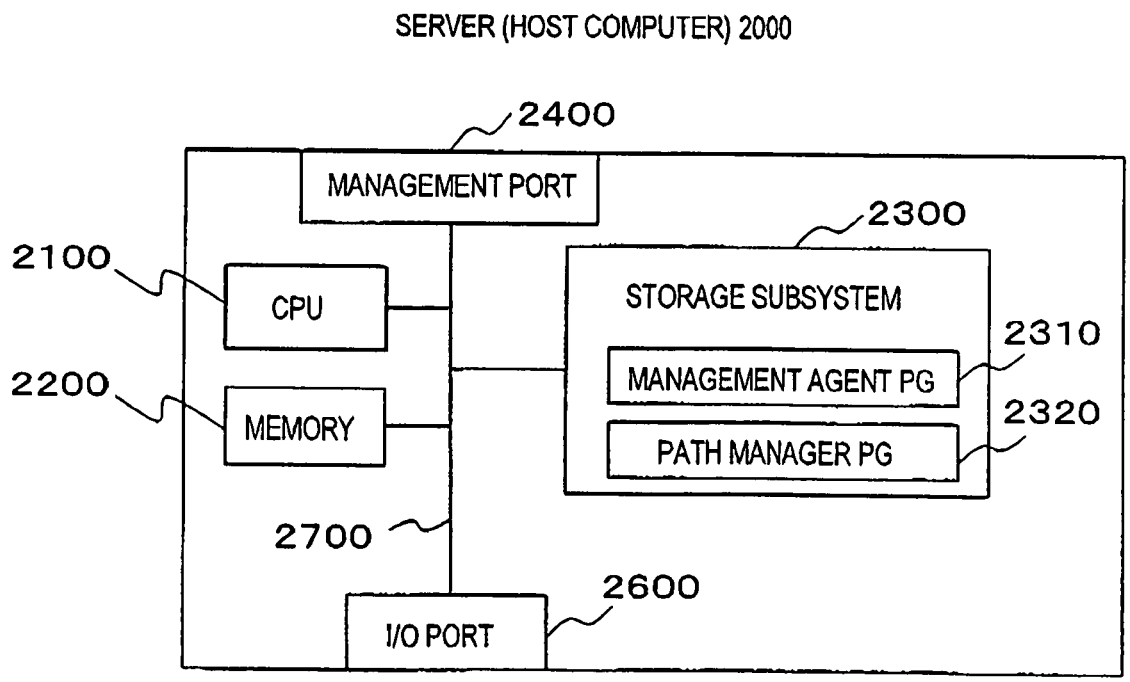
FIG. 3 is a schematic diagram of a server 2000 shown in FIG. 1.

FIG. 3 is a schematic diagram of the server 2000 shown in FIG. 1.

As shown in the figure, the server 2000 has a CPU 2100, a memory 2200, a storage subsystem 2300, a management port 2400 used for connecting to a management network 6000, an I/O port 2600 used for connecting to the Fibre Channel network (FC SW 3000), and a bus 2700 which connects these respective devices mutually. In FIG. 3, the I/O port 2600 is one, but maybe a plurality of I/O ports 2600. In the storage subsystem 2300, a management agent PG 2310 and a path manager PG 2320 are stored. The CPU 2100 loads the management agent PG 2310 to the memory 2200 and executes it, and thereby, communicates with the migration manager PG 4345 and the operation PG 1310 through the management network 6000, and transmits and receives a configuration of the server 2000. Also, the CPU 2100 loads the path manager PG 2320 to the memory 2200 and executes it, and thereby, controls an access path to a logical volume that the server 2000 manages.

The FC SW 3000 has a plurality of I/O ports used for connecting to each I/O port of the server 2000, the new storage device 4000, and the old storage device 5000, and has a communication function between these pluralities of I/O ports. In FIG. 1, one unit of the FC SW 3000 is shown, but the number of FC SW 3000 may be plural.

Figure 4:
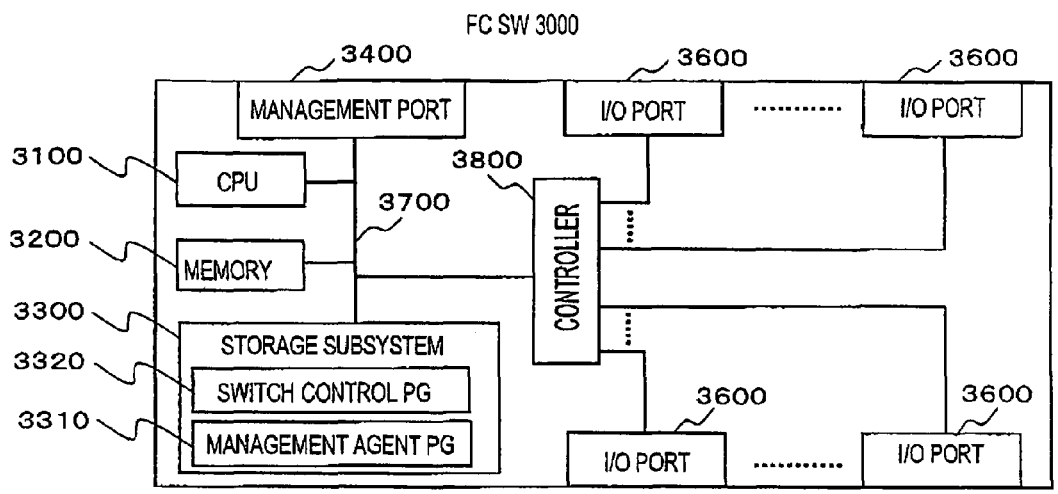
FIG. 4 is a schematic diagram of FC SW 3000 shown in FIG. 1.

FIG. 4 is a schematic diagram of the FC SW 3000 shown in FIG. 1.

As shown in the figure, the FC SW 3000 has a CPU 3100, a memory 3200, a storage subsystem 3300, a management port 3400 used for connecting to the management network 6000, a plurality of I/O ports 3600 used for connecting to each I/O port of the server 2000, the new storage device 4000 and the old storage device 5000, a controller 3800 which carries out switching control of communication between the plurality of the I/O ports 3600, and a bus 3700 which connects these respective devices mutually. In the storage subsystem 3300, the management agent PG 3310 and an SW (switch) control PG 3320 are stored. The CPU 3100 loads the management agent PG 3310 to the memory 3200 and executes it, and thereby, communicates with the migration manager PG 4345 and the operation PG 1310 through the management network 6000, and transmits and receives a configuration of the FC SW 3000. Also, the CPU 2100 loads the SW control PG 3320 to the memory 2200 and executes it, and thereby, has the controller 3800 carried out switching control of communication between the plurality of I/O ports 3600. Also, it provides a zoning function which limits communication to inside of a group (zone) of specific I/O ports 3600.

The new storage device 4000 is a storage device which is newly implemented to a computer system. In configuration of this new storage device 4000, the configuration which was set up in the old storage device 5000 is reflected.

Figure 5:
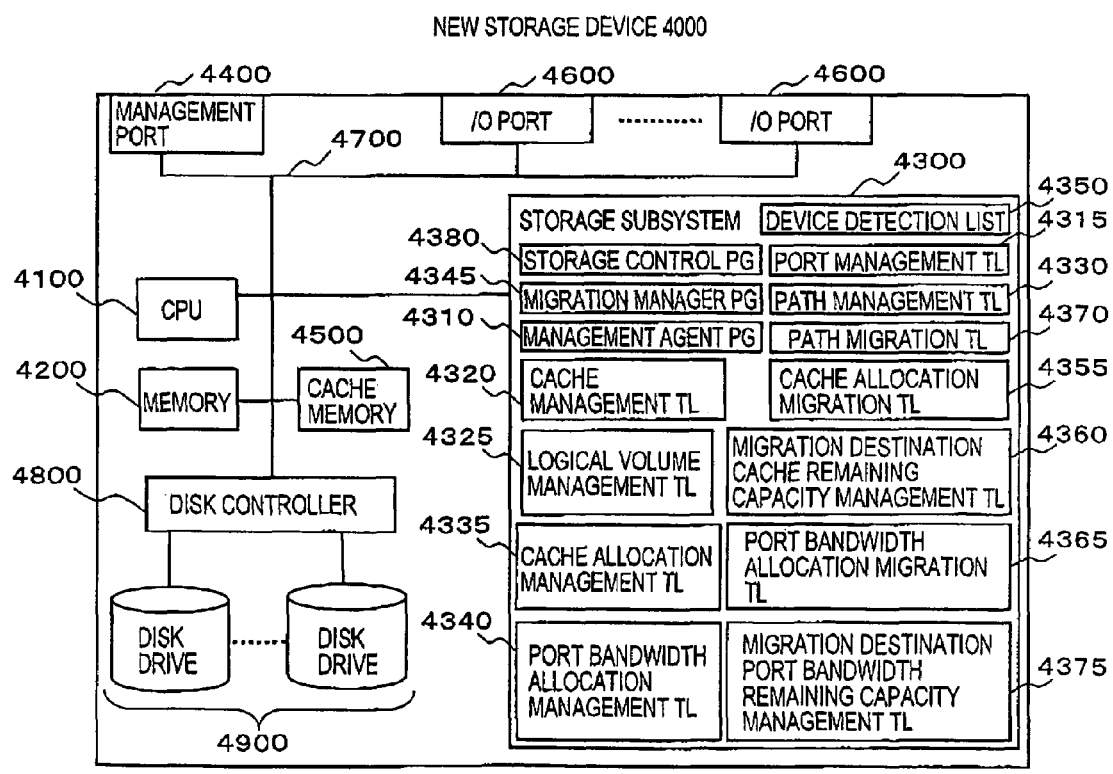
FIG. 5 is a schematic diagram of a new storage device 4000 shown in FIG. 1.

FIG. 5 is a schematic diagram of the new storage device 4000 shown in FIG. 1.

As shown in the figure, the new storage device 4000 has a CPU 4100, a memory 4200, a storage subsystem 4300, a management port 4400 used for connecting to the management network 6000, a cache memory 4500, at least one I/O port 4600 used for connecting to the Fibre Channel network (FC SW 3000), at least one disk drive 4900, a disk controller 4800, and a bus 4700 which connects these respective devices mutually. The disk controller 4800 controls a data transfer process to a logical volume which stores data. Here, the logical volume is a logical storage area configured by at least one disk drive 4900. The cache memory 4500 is utilized to cache data which is stored in the disk drive 4900, in order to have a data access request improved from the server 2000. In addition, the cache memory 4500 may be realized by utilizing a part of a storage area of the memory 4200.

In the storage subsystem 4300, the management agent PG 4310, the port management TL (table) 4315 in which management information of an I/O port of an own storage device is registered, the cache management TL 4320 in which management information of a cache memory of an own storage device is registered, the logical volume management TL 4325 in which management information of a logical volume of an own storage device is registered, the path management TL 4330 in which management information of a path which logically connects a logical volume and an I/O port in order to provide the logical volume of an own storage device to the server 2000 is registered, the cache allocation management TL 4335 in which management information of cache allocation for each logical volume in an own storage device is registered, the port bandwidth allocation management TL 4340 in which management information which is used to control, at an I/O port, a data bandwidth when the server 2000 accesses to a logical volume is registered, the migration manager PG 4345, the device detection list 4350 in which attribute information of a device whose configuration is detected by the migration manager PG 4345 is registered, the cache allocation migration TL 4355 which is used in case that the migration manager PG 4345 has cache allocation set up in the old storage device 5000 taken over to the new storage device 4000, the migration destination remaining capacity management TL 4360 that the migration manager PG 4345 uses for management of unallocated cache of the new storage device 4000, the port bandwidth allocation migration TL 4365 which is used in case that the migration manager PG 4345 has port bandwidth which is set up in the old storage device 5000 taken over to the new storage device 4000, a path migration TL 4370 which is used in case that the migration manager PG 4345 migrates a path to the old storage device 5000 to the new storage device 4000, a migration destination port bandwidth remaining capacity management TL 4375 that the migration manager PG 4345 uses for management of port bandwidth of the new storage device 4000, and the storage control PG 4380, are stored.

In addition, a configuration of the old storage device 5000 as a storage device which has been already implemented to the computer system is basically the same as the new storage device 4000 shown in FIG. 5. In this regard, however, in the old storage device 5000, the migration manager PG 4345, the device detection list 4350, the cache allocation migration TL 4355, the migration destination cache remaining capacity management TL 4360, the port bandwidth allocation migration TL 4365, and the migration destination port bandwidth remaining capacity management TL 4375, are unnecessary. In addition, hereinafter, it will be described by setting up reference numerals of a CPU, memory, storage subsystem, management port, cache memory, I/O port, disk drive, disk controller and bus that the old storage device 5000 has, as CPU 5100, memory 5200, storage subsystem 5300, management port 5400, cache memory 5500, I/O port 5600, disk drive 5900, disk controller 5800, and bus 7700, respectively. Also, it will be described by setting up reference numerals of management agent PG, port management TL, cache management TL, logical volume management TL, bus management TL, cache allocation management TL, port bandwidth allocation management TL, bus migration TL, and storage control PG which are stored in the storage subsystem 5300 as management agent PG 5310, port management TL 5315, cache management TL 5320, logical volume management TL 5325, bus management TL 5330, cache allocation management TL 5335, port bandwidth allocation management TL 5340, bus migration TL 5370, and storage control PG 5380, respectively.

In the storage devices 4000, 5000, the CPUs 4100, 5100 load the storage control PGs 4380, 5380 to the memories 4200, 5200 and execute them, and thereby, carries out allocation of I/O port etc. to each logical volume, control of the disk controllers 4800, 5800 and so on. Also, the CPUs 4100, 5100 load the management agent FGs 4310, 5310 to the memories 4200, 5200 and execute them, and thereby, communicate with the migration manager PG 4345 and the operation PG 1310, and transmit and receive a configuration of the storage devices 4000, 5000. Furthermore, in the new storage device 4000, the CPU 4100 loads the migration manager PG 4345 to the memory 4200 and executes it, and thereby, obtains a configuration such as port bandwidth, cache allocation and so on, from the management agent PGs 2310, 3310, 4310, 5310 from each device, and carries out a migration process which will be described later.

In the port management TLs 4315, 5315, as described above, management information of each I/O port 4600, 5600 of own storage device 4000, 5000 is registered.

FIG. 6 is a view for explaining configurations the port management TLs 4315, 5315. As shown in the figure, one record is formed by having a field 43151 for a registration of a port ID which is an identifier of an I/O port in an own storage device, a field 43152 for a registration of a port WWN (World Wide Name) which is an identifier of an I/O port in the Fibre Channel network, a field 43153 for a registration of SCSI ID which is an identifier for uniquely identifying an I/O port in a SCSI protocol which is a communication program defined on the Fibre Channel protocol that the Fibre Channel network adopts, a field 43154 for a registration of Fibre Channel bandwidth capacity of an I/O port, and a field 43155 for a registration of Fibre Channel bandwidth remaining capacity of an I/O port. Here, the Fibre Channel bandwidth capacity designates a bandwidth of the Fibre Channel network allocated to an I/O port. Also, the Fibre Channel bandwidth remaining capacity designates a remaining capacity of the Fibre Channel bandwidth which can be further allocated to an I/O port. In addition, an example of FIG. 6 shows the port management TL 5315 of the old storage device 5000 and each record of four I/O ports 5600 "port-b1", "port-b2", "port-b3", "port-b4" of the old storage device 5000 is registered therein.

In the cache management TLs 4320, 5320, as described above, management information of the cache memories 4500, 5500 of own storage devices 4000, 5000 have is registered.

FIG. 7 is a view for explaining configurations of the cache management TLs 4320, 5320. As shown in the figure, a record is formed by having a field 43201 for a registration of total capacity of a cache memory of an own storage device and a field 43202 for a registration of remaining capacity which is not allocated to a logical volume out of total capacity of a cache memory of an own storage device. An example of FIG. 7 shows the cache management TL 5320 of the old storage device 5000, and shows that the cache memory 4500 of 10 GB is mounted on the old storage device 5000, and a logical volume unallocation area of 7.5 GB exists in the cache memory 4500.

In the logical volume management TLs 4325, 5325, as described above, management information of logical volumes of own storage devices 4000, 5000 is registered.

FIG. 8 is a view for explaining configurations of the logical volume management TLs 4325, 5325. As shown in the figure, a record is formed by having a field 43251 for a registration of a logical volume ID which is an identifier of a logical volume in an own storage device, a filed 43252 for a registration of a list of path IDs which uniquely identify paths connected to a logical volume, a field 43253 for a registration of capacity of a logical volume, and a field 43254 for a registration of physical data arrangement information (parity group) of a logical volume. An example of FIG. 8 shows the logical volume management TL 5325 of the old storage device 5000, and each record of three logical volumes "vb1", "vb2", "vb3" of the old storage device 5000 is registered therein.

In the bus management TLs 4330, 5330, as described above, management information of a path connected to a logical volume of an own storage device, is registered.

FIG. 9 is a view for explaining configurations of the path management TLs 4330, 5330. As shown in the figure, a record is formed by having a field 43301 for a registration of a path ID which is an identifier of a path in an own storage device, a field 43302 for a registration of a port ID of an I/O port allocated to a path, a field 43303 for a registration of a LUN (Logical Unit Number) which indicates a SCSI logical unit number allocated to a path, in a SCSI protocol which is a communication program defined on the Fibre Channel protocol that the Fibre Channel network adopts, and a field 43304 for a registration of a logical volume ID of a logical volume allocated to a path. An example of FIG. 9 shows the path management TL 5330 of the old storage device 5000, and each record of four paths "path-b1", "path-b2", "path-b3", "path-b4" of the old storage device 5000 is registered therein.

In the cache allocation management TLs 4335, 5335, as described above, management information of cache allocation to a logical volume of an own storage device, is registered.

FIG. 10 is a view for explaining configurations of the cache allocation management TLs 4335, 5335. As shown in the figure, a record is formed by having a field 43351 for a registration of a logical volume ID of a logical volume of a cache allocation object, a field 43352 for a registration of a cache allocation amount which is capacity of a cache allocated to a logical volume, a filed 43353 for a registration of its resident capacity and resident area, in case that a logical volume has a part of a data area stayed resident in a cache. Here, it is assumed that a cache resident area is indicated by an address LBA (Logical Block Addressing) with block unit in a logical volume. In addition, these cache allocation management TLs 4335, 5335 are not necessary in a storage device which does not have a cache allocation function and a cache resident function. Also, the cache allocation function and the cache resident function are not to be necessarily utilized by all logical volumes. An example of FIG. 10 shows the cache allocation management TL 5335 of the old storage device 5000. To the logical volume "vb1", a cache of 1 GB is allocated, and 300 MB therein of LBA "0" to "153600" is utilized for cache resident. To the logical volume "vb2", a cache is not allocated, but 500 MB of LBA "0", to "256000" is utilized for cache resident. And, to the logical volume "vb3", a cache of 1 GB is allocated, but cache resident is not carried out.

In the port bandwidth allocation management TLs 4340, 5340, as described above, management information for controlling a data bandwidth by an I/O port, when the server 2000 accesses to a logical volume of an own storage device.

FIG. 11 is a view for explaining configurations of the port bandwidth allocation management TLs 4340, 5340. As shown in the figure, a record is formed by having a field 43401 for a registration of a path ID of a path connected to an I/O port of a port bandwidth allocation object, a field 43402 for a registration of a port ID of an I/O port of a port bandwidth allocation object, and a field 43403 for a registration of a bandwidth allocated to an I/O port of a port bandwidth allocation object. In addition, these port bandwidth allocation management TLs 4340, 5340 are not necessary in a storage device which does not have a bandwidth allocation function in which a data bandwidth is controlled at an I/O port. An example of FIG. 11 shows the port bandwidth allocation management TL 5340 of the old storage device 5000, and to the path "path-b1" which utilizes the I/O port "port-b1", a bandwidth of 100 MB/s is allocated, and to the path "path-b2" which utilizes the I/O port "port-b2" and the path "path-b3" which utilizes the I/O port "port-b3", a bandwidth of 50 MB/s is allocated, respectively.

In the device detection list 4350, as described above, attribute information of a device in which the migration manager PG 4345 detects a configuration, is registered.

FIG. 12 is a view for explaining a configuration of the device detection list 4350. As shown in the figure, a record is formed by having a field 43501 for a registration of a detection object ID which is an identifier of a device as an object to be detected, a field 43502 for a registration of a type of the device as an object to be detected, a field 43503 for a registration of device information such as an actual manufacturer, a product name etc. of the device as an object to be detected, and a field 43504 for a registration of an IP address of the device as an object to be detected. In an example of FIG. 12, attribute information of the old storage device 5000 is registered. The new storage device 4000 accesses to the old storage device 5000 through the management network 6000, in accordance with the device detection list 4345 by the migration manager PG 4345, and obtains a configuration of the old storage device 5000. In addition, a system administrator etc. of a computer system registers a record of the device detection list 4350 by using the management terminal 1000. Or, it is automatically registered by using a name service etc. that the Fibre Channel protocol provides.

In the cache allocation migration TL 4355, as described above, information which is necessary for the migration manager PG 4345 to have cache allocation set up in the old storage device 5000 taken over to the new storage device 4000, is registered.

FIG. 13 is a view for explaining a configuration of the cache allocation migration TL 4355. As shown in the figure, a record is formed by having a field 43551 for a registration of a processed flag showing whether definition to a migration destination (takeover destination) of cache allocation setup in the old storage device 5000 was processed or not, a field 43558 for a registration of migration source cache definition which is definition of cache allocation set up in a migration source, i.e., the old storage device 5000, and a field 43559 for a registration of migration destination cache definition which is definition of cache allocation to be set up in a migration destination, i.e., the new storage device 4000. In case that a record is registered in the cache allocation migration TL 4355, in a processed flag registered in the field 43551 of the record, during the early stage, "yet" which indicates that the migration destination cache definition has not yet been prepared, is registered, and at such a stage that the migration destination cache definition was prepared in a migration process which will be described later, it is rewritten to a "done" flag which indicates that it has already prepared. The field 43558 for a registration of the migration destination cache definition has a content of the cache allocation management TL 5335 of the old storage device 5000 as sub-fields, and is formed by copying the content of the cache allocation management TL 5335. In short, it has a sub-field 43552 for a registration of a logical volume ID of a logical volume of the old storage device 5000, a sub-field 43553 for a registration of a cache allocation amount which is capacity of a cache to be allocated to a logical volume, a sub-field 43554 for a registration of its resident capacity and resident area in case that a logical volume has a part of a data area stayed resident in a cache. Also, the field 43559 for a registration of migration destination cache definition has a content of the cache allocation management TL 4335 registered in the new storage device 4000 in a migration process which will be described later as sub-fields, and is formed by copying the content of the cache allocation management TL 4335. In short, it has a sub-field 43555 for a registration of a logical volume ID of a logical volume of the new storage device 4000, a sub-field 43556 for a registration of a cache allocation amount which is capacity of a cache to be allocated to a logical volume, and a sub-field 43557 for a registration of its resident capacity and resident area, in case that a logical volume has a part of a data area stayed resident in a cache.

The cache remaining capacity management TL 4360, as described above, is used for the migration manager PG 4345 to manage an unallocated cache of the new storage device 4000.

FIG. 14 is a view for explaining a configuration of the migration destination cache remaining capacity management TL 4360. As shown in the figure, in the migration destination cache remaining capacity management TL 4360, capacity of an unallocated cache to a logical volume of the new storage device 4000 which is a migration destination of a configuration is registered. The migration destination cache remaining capacity management TL 4360 is utilized to confirm whether total capacity of cache allocation shown by a plurality of prepared migration destination cache definitions exceeds remaining capacity of the cache memory 4500 of the new storage device 4000 which is a migration destination, in a step of a migration process which will be described later.

In the port bandwidth allocation migration TL 4365, as described above, information required to have the migration manager PG 4345 taken over a port bandwidth set up in the old storage device 5000 to the new storage device 4000, is registered.

FIG. 15 is a view for explaining a configuration of the port bandwidth allocation migration TL 4365. As shown in the figure, a record is formed by having a field 43651 for a registration of a processed flag indicating whether definition of port bandwidth allocation set up in the old storage device 5000 to a migration destination (takeover destination) has been already processed or not, a field 43658 for a registration of migration source port definition as definition of port bandwidth allocation set up in a migration source, i.e., the old storage device 5000, and a field 43659 for a registration of migration destination port definition as definition of port bandwidth allocation set up in a migration destination, i.e., the new storage device 4000. In case that a record is registered in the port bandwidth allocation migration TL 4365, in a processed flag registered in the field 43651 of the record, during the early stage, "yet" which indicates that the migration destination port definition has not yet been prepared, is registered, and at such a stage that the migration destination port definition prepared in a migration process which will be described later, it is rewritten to a "done" flag which indicates that it has already prepared. The field 43658 for a registration of the migration source port definition has a content of the port bandwidth allocation management TL 5340 of the old storage device 5000 as sub-fields, and is formed by copying the content of, the port bandwidth allocation management TL 5340. In short, it has a sub-field 43652 for a registration of a path ID of a path connected to an I/O port of the old storage device 5000, a sub-field 43653 for a registration of a port ID of an I/O port of the old storage device 5000, and a sub-field 43654 for a registration of a bandwidth allocated to an I/O port of the old storage device 5000. Also, the field 43659 for a registration of migration destination port definition has a content of the port bandwidth management TL 4340 registered in the new storage device 4000 by a migration process which will be described later as sub-fields, and is formed by copying the content of the port bandwidth allocation management TL 4340. In short, it has a sub-field 43655 for a registration of a path ID of a path connected to an I/O port of the new storage device 4000, a sub-field 43656 for a registration of a port ID of an I/O port of the new storage device 4000, and a sub-field 43657 for a registration of a bandwidth allocated to an I/O port of the new storage device 4000.

In the path migration TL 4370, as described above, information required for the migration manager PG 4345 to migrate a path to the old storage device 5000 to the new storage device 4000, is registered.

FIG. 16 is a view for explaining a configuration of the path migration TL 4370. As shown in the figure, a record is formed by having a field 43701 for a registration of a processed flag indicating whether definition to a migration destination (takeover destination) of a path of the old storage device 5000 has been already processed or not, a field 43710 for a registration of migration source path definition as definition of a path of a migration source, i.e., the old storage device 5000, and a field 43711 for a registration of migration destination path definition as definition of a path of a migration destination, i.e., the new storage device 4000. In case that a record is registered in the path migration TL 4370, in a processed flag registered in the field 43701 of the record, during the early stage, "yet" which indicates that the migration destination path definition has not yet been prepared, is registered, and at such a stage that the migration destination path definition prepared in a migration process which will be described later, it is rewritten to a "done" flag which indicates that it has already prepared. The field 43701 for a registration of migration source path definition has a content of the path management TL 5330 of the old storage device 5000 as sub-fields, and is formed by copying the content of the path management TL 5330. In short, it has a sub-field 43702 for a registration of a path ID of a path of the old storage device 5000, a sub-field 43703 for a registration of a port ID of an I/O port allocated to the path, a sub-field 43704 for a registration of LUN allocated to the path, and a sub-field 43705 for a registration of a logical volume ID of a logical volume allocated to the path. Also, the field 43711 for a registration of migration destination path definition has a content of the path management TL 4330 registered in the new storage device 4000 by a migration process which will be described later as sub-fields, and is formed by copying the content of the path management TL 4330. In short, it has a sub-field 43705 for a registration of a path ID of a path of the new storage device 4000, a sub-field 43706 for a registration of a port ID of an I/O port allocated to the path, a sub-field 43707 for a registration of LUN which was allocated to the path, and a sub-field 43709 for a registration of a logical volume ID of a logical volume allocated to the path.

The migration destination port bandwidth remaining capacity management TL 4375, as described above, is used for the migration manager PG 4345 to manage a port bandwidth of the new storage device 4000.

FIG. 17 is a view for explaining a configuration of the migration destination port bandwidth remaining capacity management TL 4375. As shown in the figure, a record is formed by having a field 43751 for a registration of a port ID of an I/O port of the new storage device 4000, and a field 43752 for a registration of an unallocated bandwidth in a logical volume among bandwidths of the I/O port. Each record is utilized to confirm whether total capacity of port bandwidth allocation indicated by a plurality of prepared migration destination port definitions exceeds remaining capacity of a bandwidth of the I/O port or not, in a step of a migration process which will be described later, as to each I/O port of the new storage device 4000.

(2) Migration Process Procedure

In case that a logical volume of the old storage device 5000 is migrated to the new storage device 4000, a migration process that a device in which the migration manager PG 4345 installed carries out, in order to have a configuration set up in the old storage device 5000 taken over to the new storage device 4000, will be described. In addition, in the first embodiment of the present invention, the device in which the migration manager PG 4345 installed is the new storage device 4000.

Figure 18:
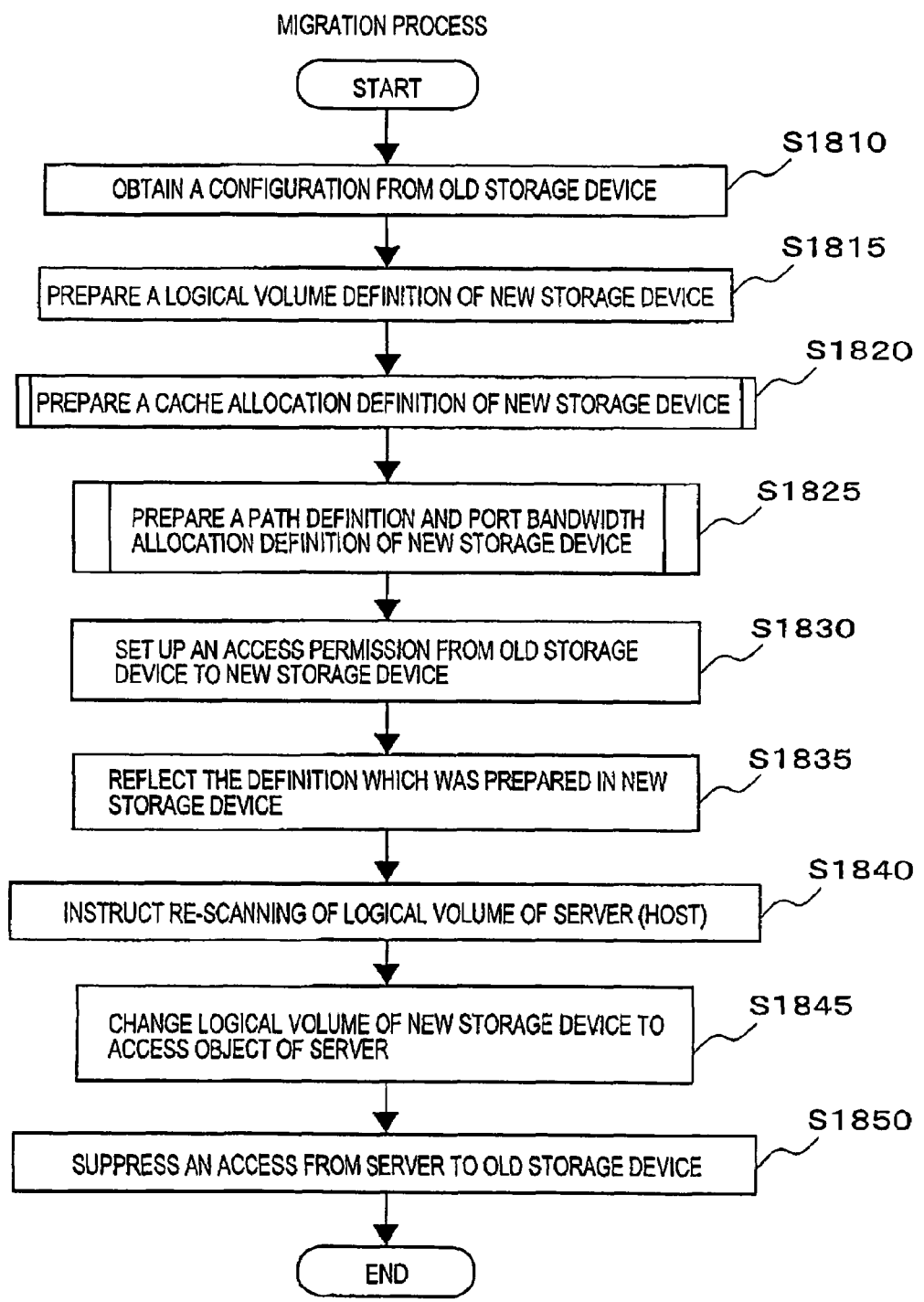
FIG. 18 is a flow chart for explaining a migration process that a device in which a migration manager PG 4345 is installed carries out, in case of migrating a logical volume that an old storage device 5000 is providing to the server 2000 to the new storage device 4000 in the first embodiment of the present invention.

FIG. 18 is, in the first embodiment of the present invention, a flow chart for explaining a migration process that a device in which a migration manager PG 4345 is installed carries out, in case of migrating a logical volume of the old storage device 5000 to the new storage device 4000.

In addition, as a pre-work of the migration process shown in FIG. 18, a system administrator of the computer system connects the new storage device 4000 to the FC SW 3000 and the management network 6000, respectively. And, he or she activates the new storage device 4000. When the new storage device 4000 is activated, the CPU 3100 of the FC SW 3000 controls the controller 3800 by using the SW control PG 3320, and detects link establishment of the I/O ports 3600. Also, it transmits status change notification to the new storage device 4000 through the management network 6000. After that, in accordance with the Fibre Channel standard, carried out are log-in from each of the I/O ports 4600 of the new storage device 4000 to the I/O ports 3600 of the FC SW 3000, log-in to the I/O port 2600 of the server 2000, and log-in to the I/O port 5600 of the old storage device 5000. At this time, in the new storage device 4000, information such as a WWN, a port ID and so on of a connection destination port to which each I/O port 4600 logged in, is to be held.

In the meantime, the CPU 4100 of the new storage device 4000, when it receives the status change notification from the FC SW 3000 by the migration manager PG 4345, obtains again network topology information from the FC SW 3000 through the management network 6000. By this, it is detected that a network connection of the new storage device 4000 to the Fibre Channel network was established, and a flow shown in FIG. 18, is started.

Firstly, in the new storage device 4000, the CPU 4100 transmits a configuration request to a detection object device indicated by attribute information registered in the device detection list 4350, i.e., the old storage device 5000, by using the management network 6000. Accordingly, the CPU 5100 of the old storage device 5000 transmits a configuration of the old storage device 5000 by the management agent PG 5310. Concretely, it transmits the port management TL 5315, the cache management TL 5320, the logical volume management TL 5325, the path management TL 5330, the cache allocation management TL 5335, and the port bandwidth allocation management TL 5340. By this, the CPU 4100 of the new storage device 4000 obtains a configuration from the old storage device 5000, and stores it in the memory 4200 (step S1810).

Next, the CPU 4100 of the new storage device 4000 prepares logical volume definition of a logical volume of the new storage device 4000 which is a migration destination of a logical volume that the old storage device 5000 provides (step S1815). Concretely, on the basis of each record registered in the logical volume management TL 5325 obtained from the old storage device 5000 in the step S1810, formed is logical volume definition of the new storage device 4000. Firstly, one of records is extracted from the logical volume management TL 5325, and a record of a logical volume of the new storage device 4000 which becomes a migration destination of the logical volume that the extracted record indicates is newly registered in the logical volume management TL 4325. This process is repeated until all records are detected from the logical volume management TL 5325.

Here, the number of path IDs registered in the field 43252 of a newly registered record is made to be same as the number of path IDs registered in the field 53252 of the extracted record. Also, capacity of a volume registered in the field 43253 of the newly registered record is made to be same as capacity of a volume registered in the field 53253 of the extracted record. Furthermore, correspondence relations of logical volume IDs and path IDs registered in the fields 53251, 53252 of the extracted record and logical volume IDs and path IDs registered in the fields 53251, 53252 of the newly registered record are stored in a memory etc. In this embodiment, it is assumed that the logical volume IDs "vb1", "vb2", "vb3" of the old storage device 5000 correspond to the logical volume IDs "va1", "va2", "va3" of the new storage device 4000, respectively. Also, it is assumed that the path IDs "path-b1", "path-b2", "path-b3" to the old storage device 5000 correspond to the logical volume IDs "path-a1", "path-a2", "path-a3" of the new storage device 4000.

Next, the CPU 4100 of the new storage device 4000 prepares cache allocation definition of a cache of the new storage device 4000 which is a migration destination of a logical volume that the old storage device 5000 provides (step S1820). This process is referred to as a cache allocation definition preparation process. Its detail will be described later. In addition, in case that a cache allocation function does not exist in the old storage device 5000 which is a migration source, for example, to the management terminal 1000, outputted is such a message that, since the cache allocation function does not exists in the old storage device 5000, cache allocation is not taken over to the new storage device 4000, and a routine goes to a step S1825 without carrying out the step S1820. Also, in case that a cache allocation function does not exists in the new storage device 4000 which is a migration destination, for example, to the management terminal 1000, outputted is such a message that, since the cache allocation function does not exists in the new storage device 4000, cache allocation is not taken over to the old storage device 5000, and the routine goes to the step S1825 without carrying out the step S1820.

Next, in the step S1825, the CPU 4100 of the new storage device 4000 prepares path definition and port bandwidth allocation definition of the new storage device 4000 which is a migration destination of a logical volume that the old storage device 5000 provides. This process is referred to as a path definition and port bandwidth allocation definition preparation process. Its detail will be described later.

By the above-described steps S1810 to 1825, preparations of logical volume definition, cache allocation definition, path definition, and cache port bandwidth allocation definition of the new storage device 4000 are completed. Accordingly, the CPU 4100 of the new storage device 4000 accesses to the FC SW 3000 through the management network 6000, and changes a zone configuration of the FC SW 3000, so as to enable mutual communication between the server 2000, the old storage device 5000 and the new storage device 4000. Also, in order to enable an access to a logical volume of the old storage device 5000 from the new storage device 4000, an access permission setup of the old storage device 5000 is changed (S1830). Concretely, the CPU 4100 of the new storage device 4000 transmits a zone configuration to the FC SW 3000 through the management network 6000. The CPU 3100 of the FC SW 3000 receives the zone configuration from the new storage device 4000 by the management agent PG 3310. And, by the SW control PG 3320, in accordance with the received zone configuration, the controller 3800 is controlled to change a zone configuration. Also, the CPU 4100 of the new storage device 4000 transmits access permission information including designation of an I/O port of the new storage device 4000, to the old storage device 5000 through the management network 6000. The CPU 5100 of the old storage device 5000 receives the access permission information from the new storage device 4000 by the management agent PG 5310. And, in accordance with the access permission information received from the new storage device 4000, in order to enable an access to a logical volume of the old storage device 5000 from the new storage device 4000, access permission setup of the old storage device 5000 is changed.

Next, the CPU 4100 of the new storage device 4000 registers the logical volume definition, the cache allocation definition, the path definition and the port bandwidth allocation definition of the new storage device 4000, which are prepared in the steps S1810 to 1825 in the logical volume management TL 4325, the cache allocation management TL 4335, the path management TL 4330 and the port bandwidth allocation management TL 4340, and sets up these definitions in the new storage device 4000 (step S1835).

Next, the CPU 4100 of the new storage device 4000 has the server 2000 carried out re-acknowledgment of a logical volume (step S1840). Concretely, the CPU 4100 of the new storage device 4000 transmits a re-scanning request of a logical volume to the server 2000 through the management network 6000. The CPU 2100 of the server 2000 receives the re-scanning request of a logical volume from the new storage device 4000 by the management agent PG 2310. And, by the path manager PG 2320, a re-scanning process of a logical volume is carried out, and device files regarding newly allocated logical volumes "va1", "va2", "va3" of the new storage device 4000 are prepared in the server 2000. For example, in a UNIX (trademark) operating system of Hewlett-Packard Company, by a command of "IOSCAN", carried out are recognition of a new logical volume, and preparation of a device file which is such means that an operating system recognizes a logical volume.

Here, the CPU 4100 of the new storage device 4000 instructs the path manager PG 2320 of the server 2000 to manage a device file of a newly prepared logical volume of the new storage device 4000 as one in the same group as a device file of an already prepared logical volume of the old storage device 5000, by the migration manager PG 4345. Accordingly, the CPU 2100 of the server 2000 prepares a virtual device file for a device file of the same group, by the path manager PG 2320, and has an operating system on the server 2000 acknowledged it.

Next, the CPU 4100 of the new storage device 4000 transmits an access object change instruction which is used to change an access to a logical volume of the old storage device 5000 to an access to a logical volume of the new storage device 4000, to the path manager PG 2320 of the server 2000 (step S1845) Accordingly, the CPU 2100 of the server 2000 changes an access to a logical volume of the old storage device 5000 from an application which is operated in the server 2000, to an access to a logical volume of the new storage device 4000, by the path manager PG 2320. As a result of this, it becomes possible for an application operated on the server 2000 to access to a logical volume of the new storage device 4000 by the same access method as in the past. In addition, as to such a matter that an access to a logical volume of the old storage device 5000 is changed to an access to which logical volume of the new storage device 4000, for example, it may be configured such that a correspondence relation of a logical volume of the old storage device 5000 stored in a memory etc. of the new storage device 4000 in the step S1815 and a logical volume of the new storage device 4000 is included in the access object change instruction that the CPU 4100 of the new storage device 4000 transmits, and the CPU 2100 of the server 2000 carries out the above matter in accordance with the correspondence relation included in the instruction, by the path manager PG 2320. Or, it may be configured such that the server 2000 displays, on the management terminal 1000, information of a logical volume of the old storage device 5000 and a logical volume of the new storage device 4000, and a system administrator of a computer system sets it up directly to the server 2000 through the management terminal 1000.

Next, the CPU 4100 of the new storage device 4000 accesses to the FC SW 3000 through the management network 6000, and changes a zone configuration of the FC SW 3000 so as to enable mutual communication between the server 2000 except for the old storage device 5000 and the new storage device 4000. Also, in order to disable a direct access to a logical volume of the old storage device 5000 from the server 2000, access permission setup of the old storage device 5000 is changed (S1850). By this, a logical volume of the new storage device 4000 responds all of I/O access processes from an application on the server 2000. In addition, a content of a concrete process which is used to migrate data of a logical volume of the old storage device 5000 to a corresponding logical volume of the new storage device 4000, can utilize a data migration technology which has been carried out in the prior art. In this connection, its detailed description will not be described in this embodiment.

Figure 19:
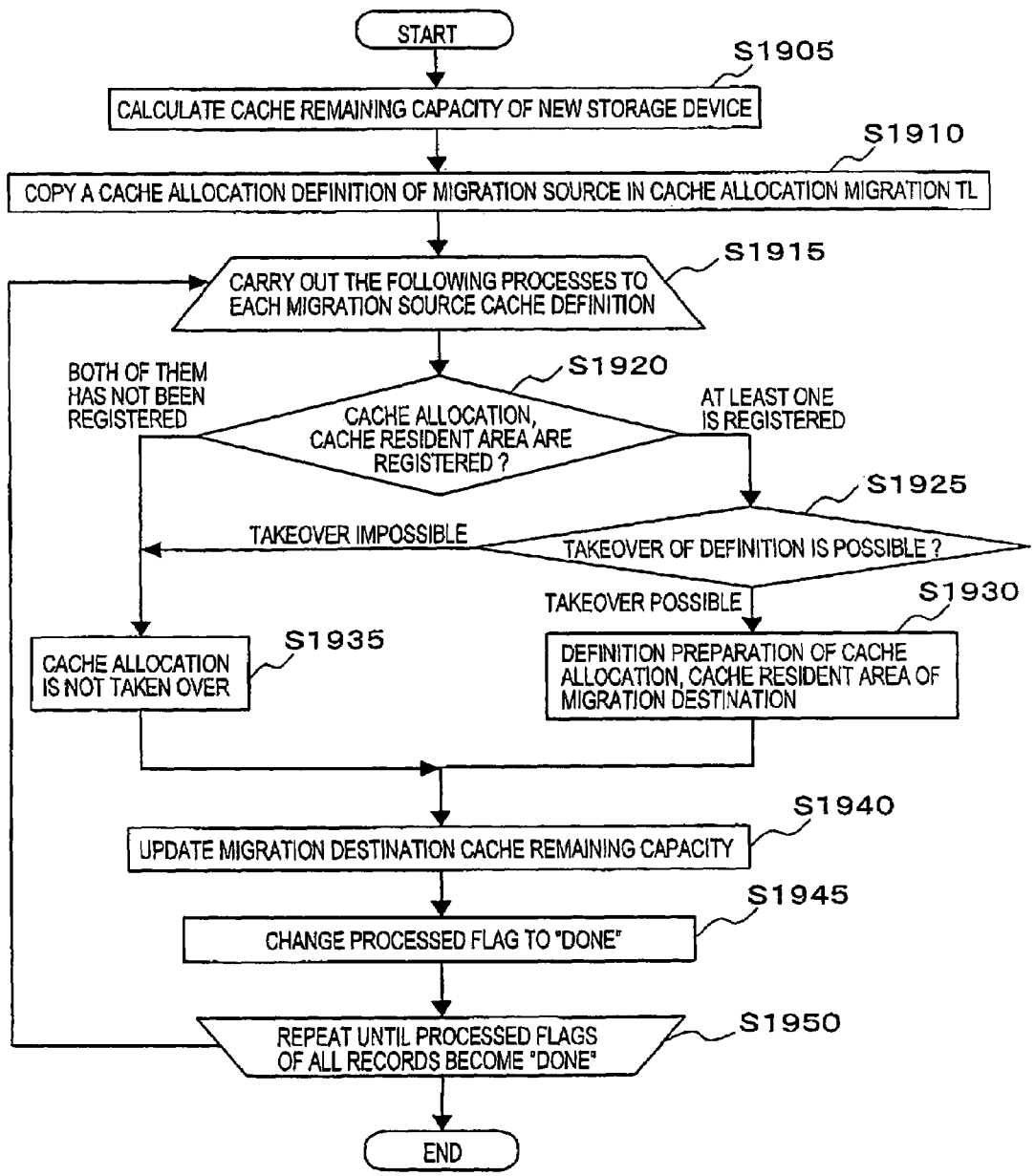
FIG. 19 is a flow chart for explaining a cache allocation definition preparation process (process by the migration manager PG 4345) carried out in a step S1820 of FIG. 18.

FIG. 19 is a flowchart for explaining a cache allocation definition preparation process (process by the migration manager PG 4345) carried out in the step S1820 of FIG. 18.

The CPU 4100 of the new storage device 4000 calculates cache remaining capacity (unallocated cache capacity) of the new storage device 4000 which is a migration destination of a logical volume that the old storage device 5000 provides, and registers its value to the migration destination cache remaining capacity management TL 4360 (step S1905). Concretely, it copies a value of cache remaining capacity registered in the field 43202 of the cache management TL 4320 of the new storage device 4000, and registers the value in the migration destination cache remaining capacity management TL 43600.

Next, the CPU 4100 of the new storage device 4000 copies cache allocation definition of the old storage device 5000 which is a migration source of a logical volume in the cache allocation migration TL 4355 (step S1910). Concretely, in the cache allocation migration TL 4355, records of the same number as all records of the cache allocation management TL 5335 of the old storage device 5000, which are obtained from the old storage device 5000 in the step S1810 of FIG. 18 are newly generated, and each record of the cache allocation management TL 5335 is copied as migration source cache definition, in the field 43558 of each record of the cache allocation migration TL 4355. In addition, in the field 43551 of each record of the cache allocation migration TL 4355, the processed flag "yet" is registered.

Next, for each of records of the cache allocation migration TL 4355 in which the migration source cache definition is registered in the field 43558, and a processed flag of the field 43551 is of "yet", processes of the steps S1920 to S1945 are repeated (steps S1915, 1950). Concretely, the following process is repeated until all of processed flags of the field 43551 of the cache allocation migration TL 4355 become "done".

Firstly, the CPU 4100 of the new storage device 4000 specifies one of the records in which the processed flag "yet" is registered in the field 43551, from the cache allocation migration TL 4355. And, it investigates whether a cache allocation amount, a cache resident area of the migration source cache allocation definition are registered in the sub-fields 43553, 43554 of the field 43558 of the specified record (referred to as specified record) or not (step S1920).

In the step S1920, in case that both of them are not registered, the sub-fields 43556, 43557 of the field 43559 of the specified record are made to be blank, i.e., the cache allocation amount, the cache resident area of the migration destination cache allocation definition are made to be of no definition (S1935). Also, on the basis of a correspondence relation of a logical volume of the old storage device 5000 stored in a memory etc. of the new storage device 4000 in the step S1815 of FIG. 18 and a logical volume of the new storage device 4000, a logical volume of the new storage device 4000, which corresponds to a logical volume of the old storage device 5000 specified by a logical volume ID of the migration source cache definition, is specified. And, in the sub-field 43555 of the field 43559 of the specified record, a volume ID of a logical volume of the corresponding new storage device 4000 is registered, and a processed flag registered in the field 43551 is changed from "yet" to "done" (step S1945).

On one hand, in the step S1920, in case that any one of the cache allocation amount and/or the cache resident area of the migration source cache allocation definition are/is registered, it is judged whether or not the migration source cache allocation definition which is the cache allocation definition of the old storage device 5000 can be taken over to the migration destination allocation definition which is the cache allocation definition of the new storage device 4000 (step S1925). Concretely, in case that the cache allocation amount and the cache resident area of the migration source cache allocation definition are smaller than cache remaining capacity registered in the migration destination cache remaining capacity management TL 4360, it is judged that takeover is possible.

In case that it is judged that takeover is possible in the step S1925, the CPU 4100 of the new storage device 4000 copies contents of the sub-fields 43553, 43554 of the field 43558 of the specified record, in the sub-fields 43556, 43557 of the field 43559 of the specified record. In short, as a cache allocation amount, a cache resident area of the migration destination cache definition, a cache allocation amount, a cache resident area of the migration source cache definition are used (step S1930). Next, a value of the migration destination cache remaining capacity management TL 4360 is updated (step S1940). Concretely, among the cache allocation amount and the cache resident area of the migration source cache definition, selected is a cache capacity value which has a larger value. And, the selected cache capacity value is subtracted from a registered value of the migration destination cache remaining capacity management TL 4360, and its result is set as an update value of the migration destination cache remaining capacity management TL 4360. Then, on the basis of a correspondence relation of a logical volume of the old storage device 5000 stored in a memory etc. of the new storage device 4000 in the step S1815 of FIG. 18 and a logical volume of the new storage device 4000, the CPU 4100 of the new storage device 4000 specifies a logical volume of the new storage device 4000 which corresponds to a logical volume of the old storage device 5000 specified by a logical volume ID of the migration source cache definition. And, in the sub-field 43555 of the field 43559 of the specified record, it registers a volume ID of a logical volume of the corresponding new storage device 4000, and changes a processed flag registered in the field 43551 from "yet" to "done" (step S1945).

Also, in case that it is judged that takeover is not possible in the step S1925, the CPU 4100 of the new storage device 4000 carries out the same process as in case that it is judged that both of the cache allocation amount and the cache resident area of the migration source cache definition are not registered in the step S1920 (steps S1935, 1945). In this regard, however, for example, it may be configured such that takeover of cache allocation definition is carried out by allocatable capacity. Concretely, in the sub-fields 43556, 43557 of the field 43559 of the specified record, the contents of the sub-fields 43553, 43554 of the field 43558 of the specified record are copied. On this occasion, a copy value which exceeds a registration value of the migration destination cache remaining capacity management TL 4360 is reduced to a registration value or less of the migration destination cache remaining management TL 4360. And, the reduced copy value (larger one of values registered in the sub-fields 43556, 43557) is subtracted from a register value of the migration destination cache remaining capacity management TL 4360, and the migration destination cache remaining capacity management TL 4360 is updated.

In addition, in the step S1935, in case that takeover of a cache allocation definition of a certain logical volume is not carried out, it may be configured such that the CPU 4100 of the new storage device 4000 notifies the management terminal 1000 through the management network 6000.

Here, by using the cache allocation migration TL 4355 shown in FIG. 13, a concrete example of a cache allocation definition preparation process shown in FIG. 19 will be described. As shown in FIG. 13, when the steps S1920 to S1945 of FIG. 18 are carried out to an initial record of the cache allocation migration TL 4355, it is judged that a cache allocation definition of the logical volume "vb1" of the old storage device 5000 can be migrated to the logical volume "vb1" of the new storage device 4000, and it takes over a cache allocation amount "1 GB" and a cache resident area "300 MB (addresses 0 to 153600)". As a result of that, cache memory remaining capacity of the new storage device 4000 becomes such a value that 1 GB is subtracted from a value registered in the migration destination cache remaining capacity management TL 4360, and a registration value of the migration destination cache remaining capacity management TL 4360 is updated (in FIG. 14, updated to 9 GB). In this manner, by a cache allocation definition preparation process shown in a flow of FIG. 19, the cache allocation migration table 4355 is prepared.

Figure 20:
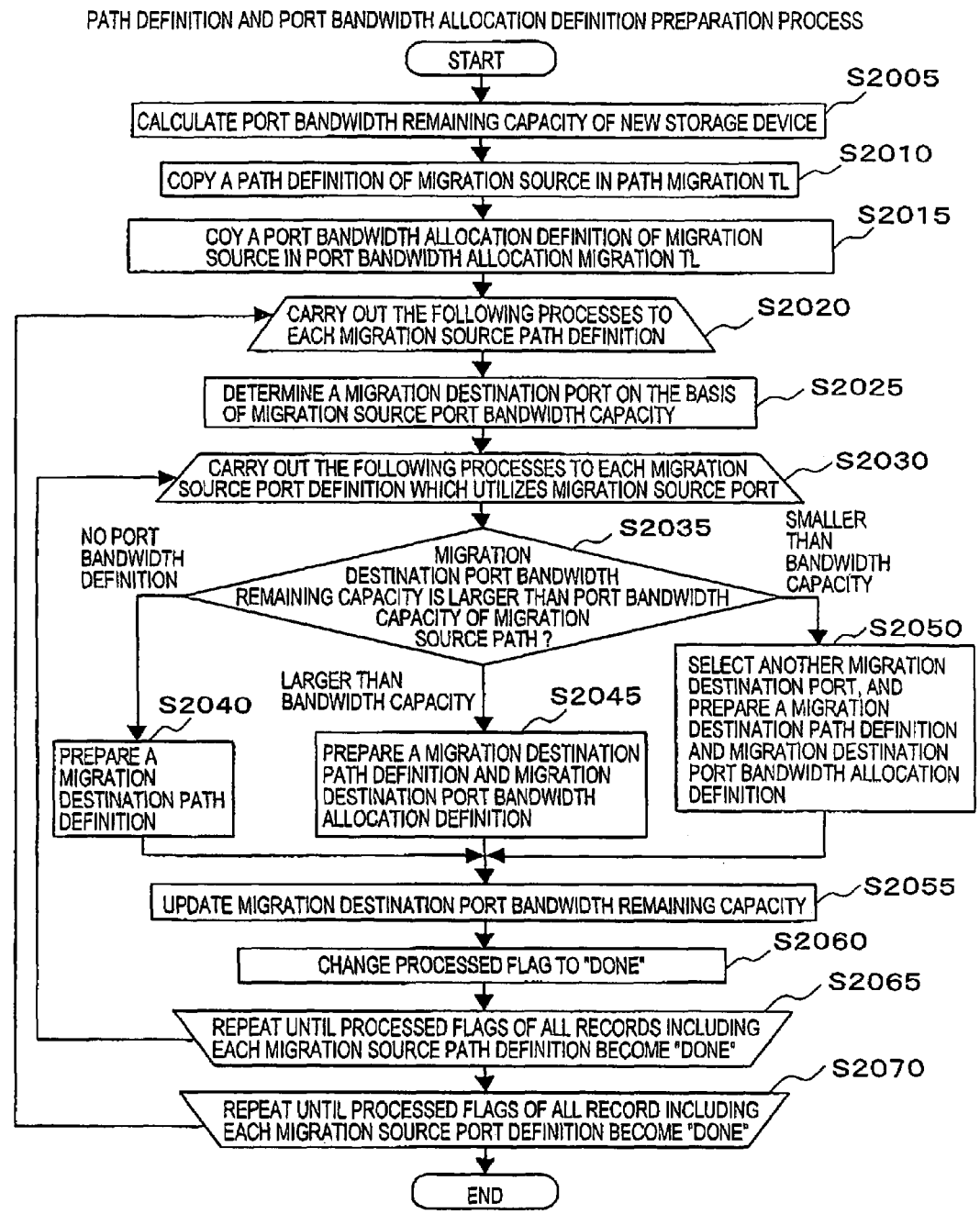
FIG. 20 is a flow chart for explaining a path definition and port bandwidth allocation definition preparation process (process by the migration manager PG 4345) carried out in a step S1825 of FIG. 18.

FIG. 20 is a flow chart for explaining the path definition and a port bandwidth allocation definition preparation process (process by the migration manager PG 4345) carried out in the step S1825 of FIG. 18.

The CPU 4100 of the new storage device 4000 calculates port bandwidth remaining capacity (unallocated port bandwidth) with respect to each port of the new storage device 4000 which is a migration destination of a logical volume that the old storage device 5000 provides, and registers its value in a corresponding record of the migration destination port bandwidth remaining capacity management TL 4375 (step S2005). Concretely, it adds each record which corresponds to each of records of the port management TL 4315 of the new storage device 4000 to the migration destination port bandwidth remaining capacity management TL 4375. And, it copies a port ID, bandwidth remaining capacity registered in the fields 43151, 43155 of a record of the port management TL 4315 in the fields 43751, 43752 of a corresponding record which is added to the migration destination port bandwidth remaining capacity management TL 4375.

Next, the CPU 4100 of the new storage device 4000 copies a path definition of the old storage device 5000 which is a migration source of a logical volume in the path migration TL 4370 (step S2010). Concretely, the records of the same number as all records of the path management TL 5330 of the old storage device 5000, which are obtained from the old storage device 5000 in the step S1810 of FIG. 18 in the path migration TL 4370 is newly generated, and each record of the path management TL 5330 is copied as a migration source path definition, in the field 43710 of each record of the path migration TL 4370. In addition, in the field 43701 of each record of the path migration TL 4370, the processed flag "yet" is registered.

Next, the CPU 4100 of the new storage device 4000 copies a port allocation definition of the old storage device 5000 in the port bandwidth allocation migration TL 4365 (step S2015). Concretely, the records of the same number as all records of the port bandwidth allocation management TL 5340 of the old storage device 5000 obtained from the old storage device 5000 in the step S1810 of FIG. 18 are generated in the port bandwidth allocation migration TL 4365, and each record of the port bandwidth allocation migration TL 5340 is copied, as a migration source port definition, in the field 43658 of each record of the port bandwidth allocation migration TL 4365. In addition, in the field 43651 of each record of the port bandwidth allocation migration TL 4365, the processed flag "yet" is registered.

Next, for each of records of the path migration TL 4370 in which the migration source path definition is registered in the field 43710 and a processed flag of the field 43701 is of "yet", processes of steps S2025 to S2065 are repeated (steps S2020, 2070). Concretely, the following process is repeated until all of processed flags of the field 43701 of the path migration TL 4370 becomes "done".

Firstly, the CPU 4100 of the new storage device 4000 specifies one of records in which the processed flag "yet" is registered in the field 43701, from the path migration TL 4370. This record is referred to as the first specified record. And, it determines a migration destination of an I/O port of the old storage device 5000 in which a port ID is registered in the sub-field 43703 of the field 43710 of the first specified record, i.e., an I/O port of the new storage device 4000 (step S2025). Concretely, from the port management TL 5315 of the old storage device 5000, it extracts a record which has a port ID registered in the sub-field 43703 of the field 43710 of the first specified record. And, it obtains bandwidth capacity of the extracted record, which is registered in the field 53154. By this, it specifies bandwidth capacity of an I/O port of the old storage device 5000 whose migration source path definition is registered in the field 43710 of the first specified record. Next, from the port management TL 4315 of the new storage device 4000, it extracts one of records in which bandwidth capacity registered in the field 43154 is larger than bandwidth capacity of an I/O port of this old storage device 5000, and determines an I/O port of the new storage device 4000 specified by this record as an I/O port of a migration destination.

In addition, in the following, it will be described on the assumption that, as migration destination ports of the I/O ports "port-b1", "port-b2", "port-b3" of the old storage device 5000, the I/O ports "port-a1", "port-a2", and "port-a3" of the new storage device 4000 are determined, respectively.

Next, the CPU 4100 of the new storage device 4000 extracts such all records that a port ID registered in the sub-field 43703 of the first specified record is registered in the sub-field 43653, i.e., such all record that the migration source port definition which utilizes an I/O port of the old storage device 5000 specified by the port ID is registered in the field 43658, from the port bandwidth allocation migration TL 4365. And, to each of the extracted records (referred to as second specified record), processes of steps S2035 to S2060 are repeated (steps S2030, 2065).

Firstly, searched is the second specified record in which a path ID registered in the sub-field 43702 of the first specified record is registered in the sub-field 43652, and a port allocation bandwidth is registered in the sub-field 43654. If the suchlike second specified record is searched, a port ID of the new storage device 4000 which corresponds to a port ID of the old storage device 5000 registered in the sub-field 43653 of the second specified record is specified on the basis of a correspondence relation of a port ID of the old storage device 5000 stored in a memory etc. and a port ID of the new storage device 4000, and bandwidth remaining capacity of an I/O port of the specified new storage device 4000 is further specified by using the migration destination port bandwidth remaining capacity management TL 4375. And, it is judged whether this remaining capacity is larger than a port allocation bandwidth registered in the sub-field 43654 of the second specified record (step S2035)

In the step S2035, in case that a path ID registered in the sub-field 43702 of the first specified record is registered in the sub-field 43652, and the second specified record whose port allocation bandwidth is registered in the sub-field 43654 does not exist, there is no necessity to take over a port allocation bandwidth of an I/O port (migration source port) of the old storage device 5000 specified by the migration source path definition registered in the field 43710 of the first specified record, to an I/O port (migration destination port) of the new storage device 4000 specified by the migration destination path definition to be registered in the field 43711 of the first specified record. In this case, the CPU 4100 of the new storage device 4000 registers the migration destination path definition in the field 43711 of the first specified record. Preparation and registration of the migration destination port definition are not carried out (step S2040).

Concretely, in the sub-field 43707 of the first specified record in the path migration TL 4370, a port ID of an I/O port of the new storage device 4000 determined as a migration destination port in the step S2025, is registered. Also, in the sub-field 43708 of the first specified record, LUN registered in the sub-field 43704 of the first specified record is copied. And, in the sub-fields 43706, 43709 of the first specified record, a path ID of the old storage device 5000 stored in a memory etc. in advance, and registered in the sub-fields 43702, 43705 of the first specified record, a path ID of the new storage device 4000 which corresponds to a logical volume ID, and a logical volume ID, are registered.

Next, a value of the migration destination port bandwidth remaining capacity management TL 4375 is remained as it is (step S2055), and a processed flag registered in the field 43701 of the first specified record is changed from "yet" to "done" (step S2060)

Also, in the step S2035, in case that the second specified record in which a path ID registered in the sub-field 43702 of the first specified record is registered in the sub-field 43652, and a port allocation bandwidth is registered in the sub-field 43654, is detected, and furthermore, bandwidth capacity of an I/O port of the new storage device 4000 which corresponds to a port ID of the old storage device 5000 registered in the sub-field 43653 of the second specified record is larger than a port allocation bandwidth registered in the sub-field 43654 of the second specified record, a port allocation bandwidth of an I/O port (migration source port) of the old storage device 5000 specified by the migration source path definition registered in the field 43710 of the first specified filed is taken over to an I/O port (migration destination port) of the new storage device 4000 specified by the migration destination path definition to be registered in the field 43711 of the first specified record. In this case, the CPU 4100 of the new storage device 4000 registers the migration destination path definition in the field 43711 of the first specified record, and registers the migration destination port definition in the field 43659 of the second specified record (step S2045).

Concretely, in the sub-field 43707 of the first specified record in the path migration TL 4370, a port ID of an I/O port of the new storage device 4000 determined as a migration destination port in the step S2025, is registered. Also, in the sub-field 43708 of the first specified record, LUN registered in the sub-field 43704 of the first specified record is copied. And, in the sub-fields 43706, 43709 of the first specified record, a path ID of the old storage device 5000 stored in a memory etc. in advance, and registered in the sub-fields 43702, 43705 of the first specified record, a path ID of the new storage device 4000 which corresponds to a logical volume ID, and a logical volume ID are registered. In the same manner, in the sub-field 43656 of the detected second specified record in the port bandwidth allocation migration TL 4365, a port ID of an I/O port of the new storage device 4000 determined as a migration destination port in the step S2025, is registered. Also, in the sub-field 43657 of the detected second specified record, a port allocation bandwidth registered in the sub-field 43654 of the detected second specified record, is copied. And, in the sub-field 43655 of the detected second specified record, a path ID of the new storage device 4000 stored in a memory etc. in advance, and corresponding to a path ID of the old storage device 5000 registered in the sub-field 43651 of the detected second specified record, is registered.

Next, by subtracting the port allocation bandwidth registered in the sub-field 43657 of the detected second specified record from a value of the migration destination port bandwidth remaining capacity management TL 4375, the migration destination port bandwidth remaining capacity management TL 4375 is updated (step S2055). And, then, a processed flag registered in the field 43701 of the first specified record is changed from "yet" to "done" (step S2060).

Furthermore, in the step S2035, in case that the second specified record in which a path D registered in the sub-field 43702 of the first specified record is registered in the sub-field 43652, and a port allocation bandwidth is registered in the sub-field 43654, is detected, and bandwidth remaining capacity of an I/O port of the new storage device 4000 which corresponds to a port ID of the old storage device 5000 registered in the sub-field 43653 of this second specified record is less than a port allocation bandwidth registered in the sub-field 43654 of this second specified record, it is impossible to have an I/O port (migration destination port) of the new storage device 4000 specified by the migration destination path definition to be registered in the sub-field 43711 of the first specified record, taken over a port allocation bandwidth of an I/O port (migration source port) of the old storage device 5000 specified by the migration source path definition registered in the field 43710 of the first specified filed, without any modification.

In this case, the process of the step S2025 is carried out and another migration destination port is newly selected. And, the steps S2030, 2035 are carried out. In case that it is confirmed that the port allocation bandwidth of the migration source port can be taken over to the newly selected migration destination port, the step S2045 is carried out. The migration destination path definition is registered in the field 43711 of the first specified record, and the migration destination port definition is registered in the field 43659 of the second specified record. This process is carried out until a migration destination port which can take over a port allocation bandwidth of a migration source port is found. In case that the suchlike migration destination port is not found, the step S2040 is carried out and, only the migration destination path definition is registered in the field 43711 of the first specified record (step S2050).

In addition, in the step S2050, the same process as in the step S2040 may be carried out from the beginning, i.e., it may be configured such that port bandwidth allocation is not taken over. Also, the result of the process may be notified to the management terminal 1000 as the port bandwidth allocation cannot be taken over completely.

Next, from a value of the migration destination port bandwidth remaining capacity management TL 4375, a port allocation bandwidth registered in the sub-field 43657 of the detected second specified record is subtracted, and the migration destination port bandwidth remaining capacity management TL 4375 is updated (step S2055). And, then, a processed flag registered in the field 43701 of the first specified record is changed from "yet" to "done" (step S2060) Here, by using the port bandwidth allocation migration TL 4365, the path migration TL 4370 and the migration destination port bandwidth remaining capacity management TL 4375 shown in FIGS. 15, 16 and 17, a concrete example of a path definition and port bandwidth allocation definition preparation process shown in FIG. 20 will be described. When the path migration TL 4370 shown in FIG. 16, S2025 to S2065 of FIG. 20 are carried out to three records from the beginning, the path definitions of the paths "path-b1", "path-b2", "path-b3" of the old storage device 5000 which is a migration source of a logical volume are taken over to the paths "path-a1", "path-a2", "path-a3" of the new storage device 4000 which is a migration destination of a logical volume. Also, it is judged that takeover of the paths "path-b1", "path-b2", "path-b3" to the port bandwidth allocation paths "path-a1", "path-a2", "path-a3" is possible, and as shown in FIG. 15, a bandwidth of 100 MB/s of the path "path-b1", a bandwidth of 50 MB/s of the path "path-b2", and a bandwidth of 50 MB/s of the path "path-a3" are taken over to a bandwidth of 100 MB/s of the path "path-a1", a bandwidth of 50 MB/s of the path "path-a2", and a bandwidth of 50 MB/s of the path "path-a3". As a result of that, as shown in FIG. 17, port bandwidth remaining capacity of the port "port-a1" of the new storage device 4000 becomes 50 MB/s obtained by subtracting 150 MB/s (both of the paths "path-a1", "path-a2" utilize the port "port-a1") from bandwidth capacity 200 MB/s of the port "port-a1", and port bandwidth remaining capacity of the port "port-a3" of the new storage device 4000 becomes 50 MB/s obtained by subtracting 50 MB/s (only the path "path-a3" utilizes the port "port-a3") from bandwidth capacity 100 MB/s of the port "port-a3".

As above, the first embodiment of the present invention is described. According to this embodiment, by carrying out the above-described migration process, it becomes possible to have cache allocation and port bandwidth allocation of the old storage device 5000 which is a migration source of a logical volume, automatically taken over to the new storage device 4000 which is a migration destination of a logical volume.

Second Embodiment

Next, a second embodiment of the present invention will be described.

Figure 21:
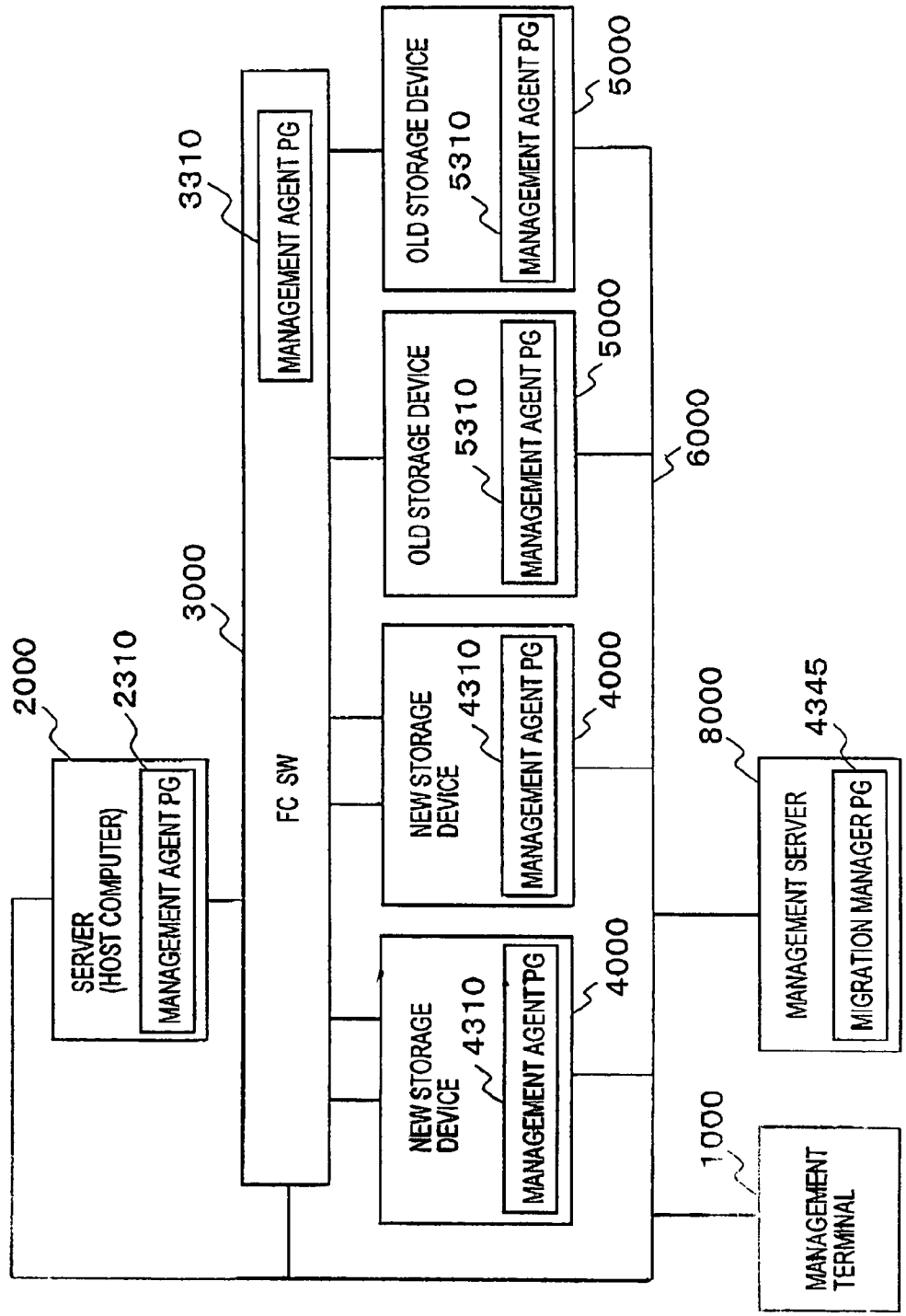
FIG. 21 is a schematic diagram of a computer system to which a second embodiment of the present invention was applied.

FIG. 21 is a schematic diagram of a computer system to which the second embodiment of the present invention is applied. As shown in the figure, different points between the computer system of this embodiment and the computer system of the first embodiment shown in FIG. 1 are as follows: a plurality of old storage devices 5000 which become migration sources of logical volumes and new storage devices 4000 which become migration destinations are provided respectively. As a device in which the migration manager PG 4345 is installed, there is a management server 8000 which is a different device from the new storage device 4000 is provided; and the management server 8000 is connected to the management network 6000. Others are the same as in the computer system of the first embodiment. In addition, in this embodiment, the same reference numerals and signs are given to ones having the same functions as in the first embodiment.

Figure 22:
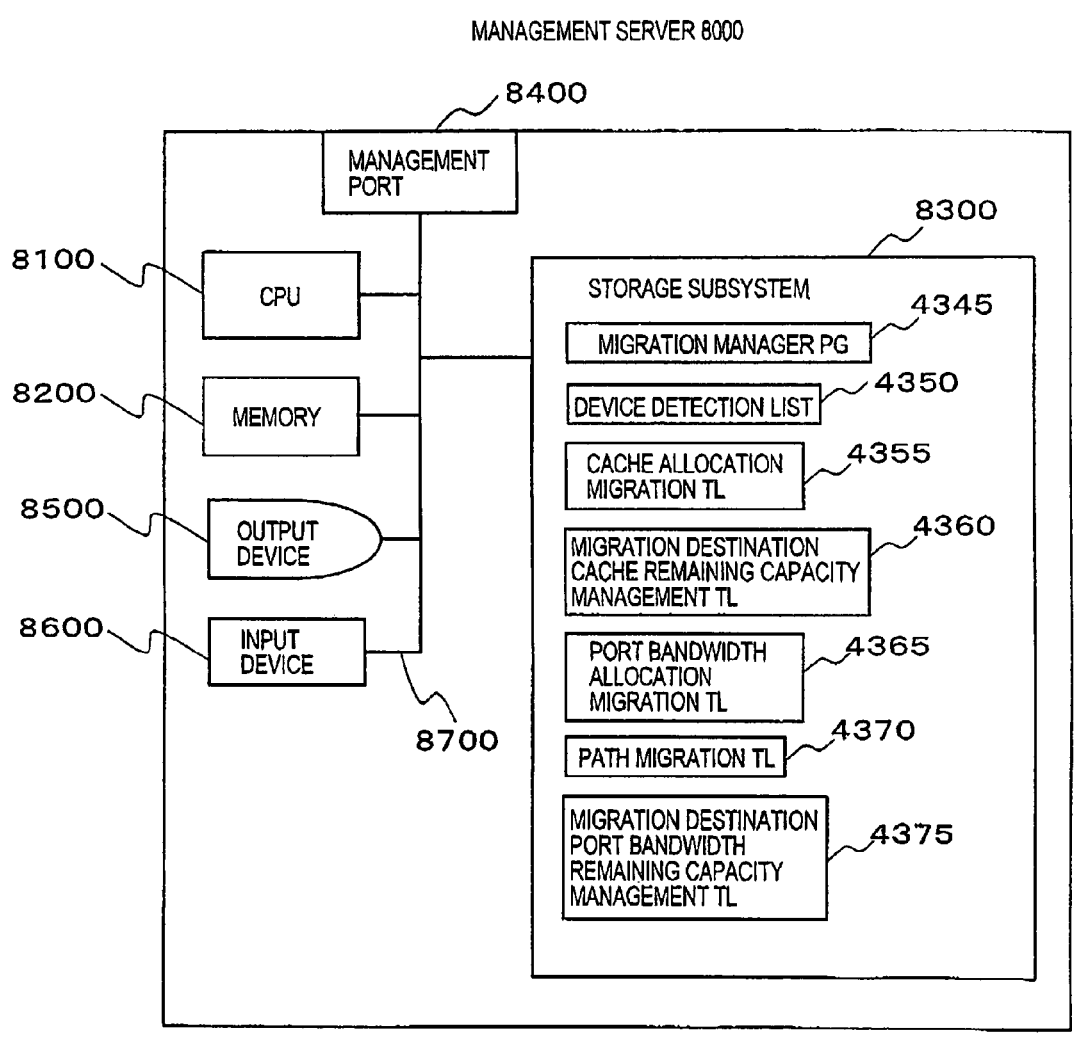
FIG. 22 is a schematic diagram of a management server 8000 shown in FIG. 21.

FIG. 22 is a schematic diagram of the management server 8000 shown in FIG. 21.

As shown in the figure, the management server 8000 has a CPU 8100, a memory 8200, a storage subsystem 8300, a management port 8400 for connecting to the management network 6000, an output device 8500 such as a display etc., an input device 8600 such as a keyboard etc., and a path 8700 which mutually connects these devices. In the storage subsystem 8300, the migration manager PG 4345, the device detection list 4350, the cache allocation migration TL 4355, the migration destination cache remaining capacity management TL 4360, the port bandwidth allocation migration table 4365, the path migration TL 4370, and the migration destination port bandwidth remaining capacity management TL 4375 are stored.

These programs and tables are basically the same as ones which are described in the first embodiment. In this regard, however, it is assumed that the device detection list 4350, the cache allocation migration TL 4355, the migration destination cache remaining capacity management TL 4360, the port bandwidth allocation migration table 4365, the path migration TL 4370, and the migration destination port bandwidth remaining capacity management TL 4375 are disposed so as to correspond to attribute information including an IP address of the new storage device 4000, with respect to each new storage device 4000. The CPU 8100, by loading the migration manager PG 4345 in the memory 8200 and executing it, obtains a configuration such as a port bandwidth, cache allocation and so on, from the management agent PGs 2310, 3310, 4310, 5310 of respective devices, and carries out the above-described migration process with respect to each new storage device 4000, by using the device detection list 4350, the cache allocation migration TL 4355, the migration destination cache remaining capacity management TL 4360, the port bandwidth allocation migration table 4365, the path migration TL 4370, and the migration destination port bandwidth remaining capacity management TL 4375 including a configuration of the old storage device which corresponds to the new storage device 4000. By this, as to each new storage device 4000 specified by attribute information, it becomes possible to have a logical volume taken over cache allocation and port allocation of the old storage device 5000 which is a migration source of the new storage device 4000.

According to this embodiment, since the CPU 8100 (migration manager PG 4345) of the management server 8000 carries out the migration process, it is possible to carry out the migration process even to the new storage device 4000 in which the migration manager PG 4345 is not installed. Also, it is possible to realize central control of the migration process in the computer system by the management server 8000.

Third Embodiment

Next, a third embodiment of the present invention will be described.

(1) System Configuration

Figure 23:
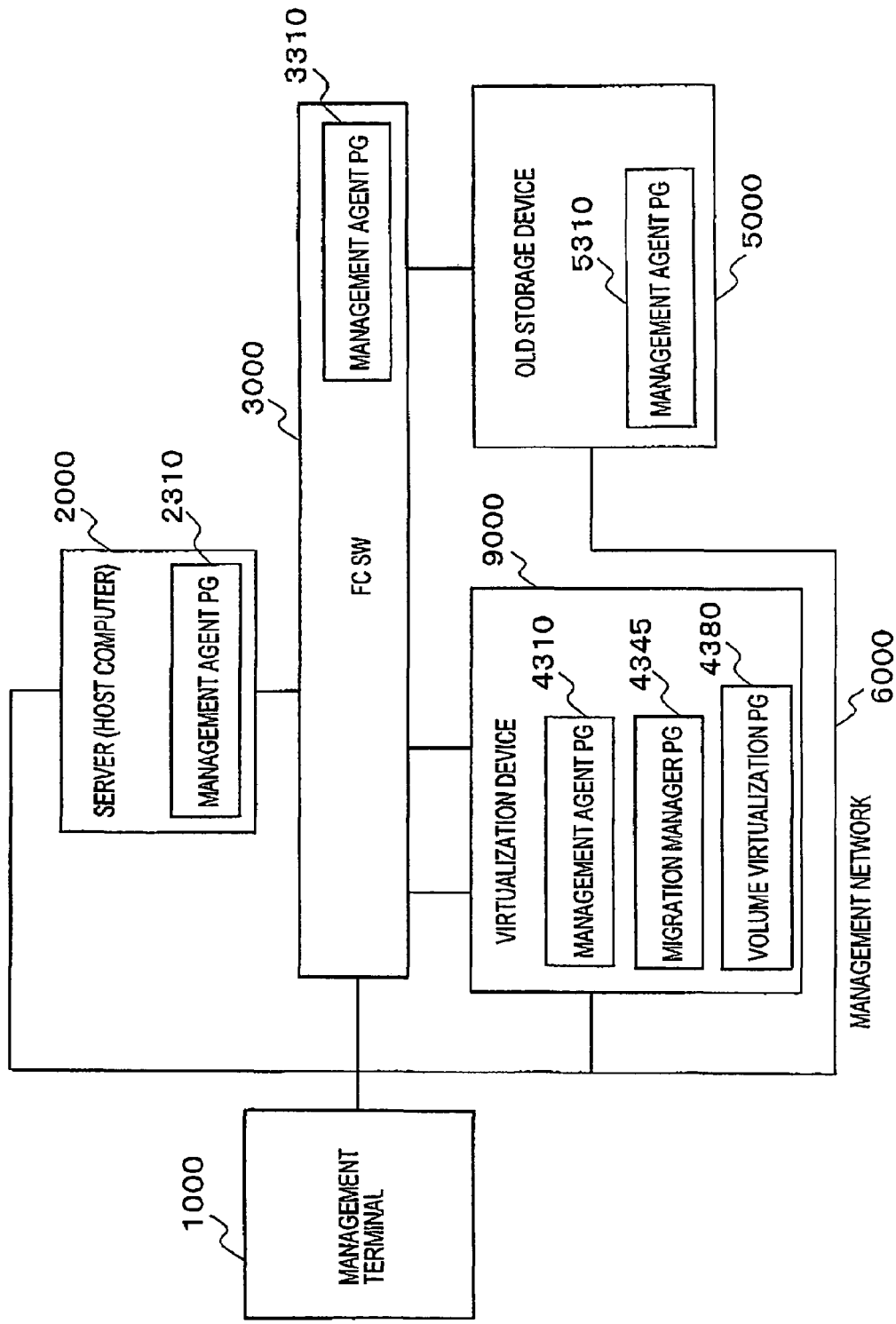
FIG. 23 is a schematic diagram of a computer system to which a third embodiment of the present invention is applied.

FIG. 23 is a schematic diagram of a computer system to which the third embodiment of the present invention is applied. As shown in the figure, a different point between the computer system of this embodiment and the computer system of the first embodiment shown in FIG. 1 is as follows; a new storage device which becomes a migration destination is a virtualization device 9000. Others are the same as in the computer system of the first embodiment. In addition, in this embodiment, the same reference numerals and signs are given to ones having the same functions as in the first embodiment.

The virtualization device 9000 manages a logical volume of the old storage device 5000, allocated to the server 2000, by a virtual volume, by using the following two functions. Function 1: Function which manages a storage area of the old storage device 5000 connected to the virtualization device 9000 and generates a volume pool. Function 2: Function which generates a virtual volume on the basis of one or more storage area in the volume pool, and redirects an I/O access to a virtual volume from the server 2000 to a corresponding storage area, and responds I/O the I/O access from the server 2000. Furthermore, the virtualization device 9000 of this embodiment is also a new storage device newly introduced into the computer system. In the same manner as in the new storage device 4000 shown in FIG. 1, the virtualization device 9000 has the management agent PG 4310, the migration manager PG 4345. Furthermore, it has a volume virtualization PG 4380 which manages by a virtual volume, a logical volume of the old storage device 5000 which is allocated to the server 2000 by using the above-described two functions.

Figure 24:
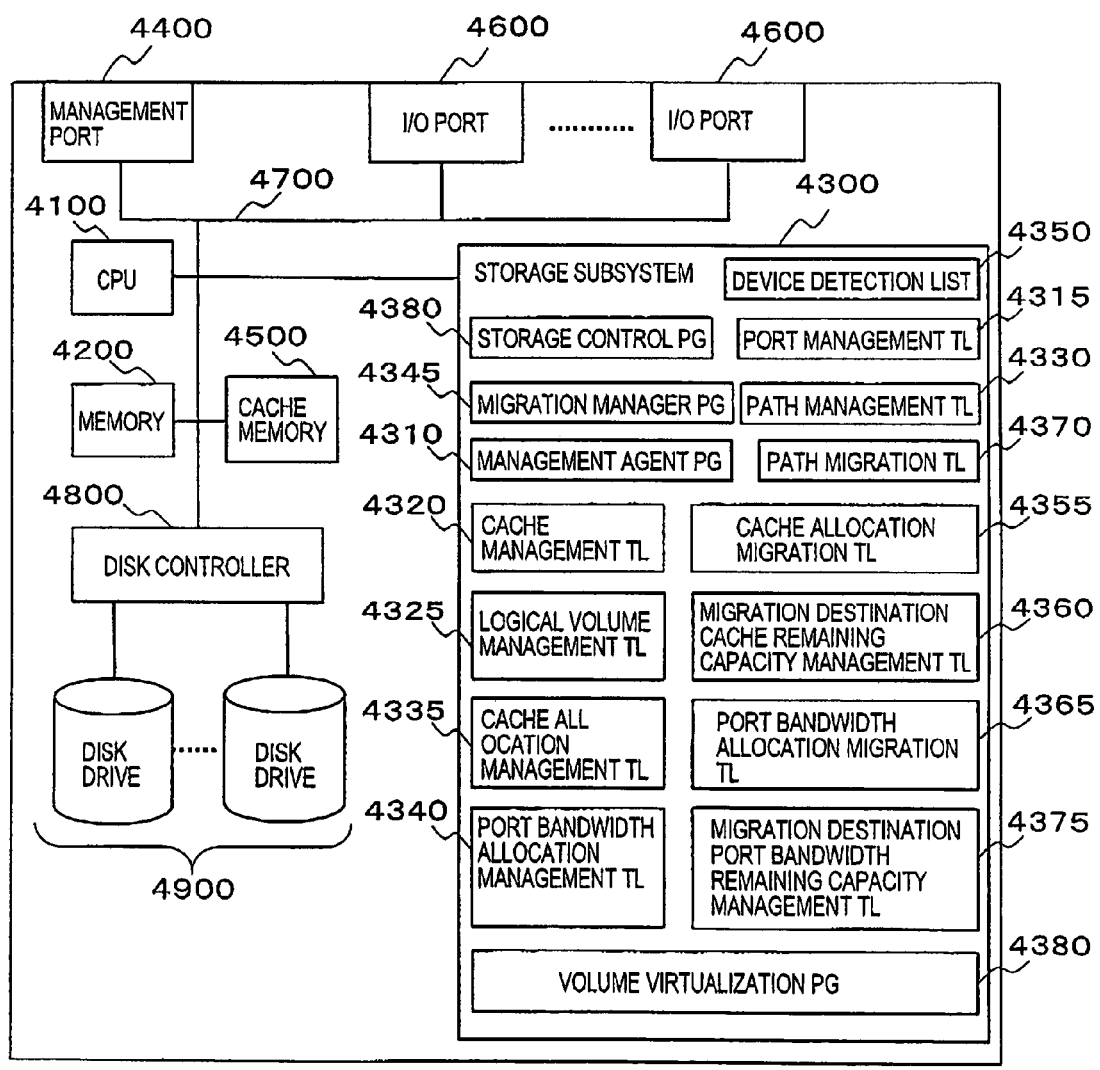
FIG. 24 is a schematic diagram of a virtualization device 9000 shown in FIG. 23.

FIG. 24 is a schematic diagram of the virtualization device 9000 shown in FIG. 23.

As shown in the figure, such a different point between the virtualization device 9000 of this embodiment and the new storage device 4000 shown in FIG. 1 is as follows; the volume virtualization PG 4380 is stored in the storage subsystem 4300. The CPU 4100 loads this volume virtualization PG 4380 on the memory 4200 and executes it, so that the above-described two functions are realized. Therefore, the virtualization device 9000 provides a virtual volume to the server 2000. This virtual volume is virtualized a logical volume that the old storage device 5000 holds as a logical volume that the virtualization device 9000 holds so as to enable an I/O access. Its concrete process content can utilize a virtual volume technology which has been carried out in the prior art. In this connection, its detailed description will not be described in this embodiment. In addition, it is possible to manage a correspondence relation of a virtual volume and a logical volume of the old storage device 5000 by registering physical data arrangement of a corresponding logical volume of the old storage device 5000, which is an actual storage area, as physical data arrangement of a virtual volume, in the field 4325 of the logical volume management TL 4325 in the virtualization device 9000.

(2) Migration Process Procedure

In case of migrating from such a mode that a part of a logical volume of the old storage device 5000 is migrated to the new storage device 4000, and the server 2000 directly accesses to another part of the logical volume of the old storage device 5000, to such a mode that the logical volume is accessed through a virtual volume of the virtualization device 9000, a migration process that the device in which the migration manager PG 4345 is installed carries out, so as to have a configuration set up in the old storage device 5000 taken over to the virtualization device 9000, will be described. In addition, in the third embodiment of the present invention, a device in which the migration manager PG 4345 is installed is the virtualization device 9000.

Figure 25:
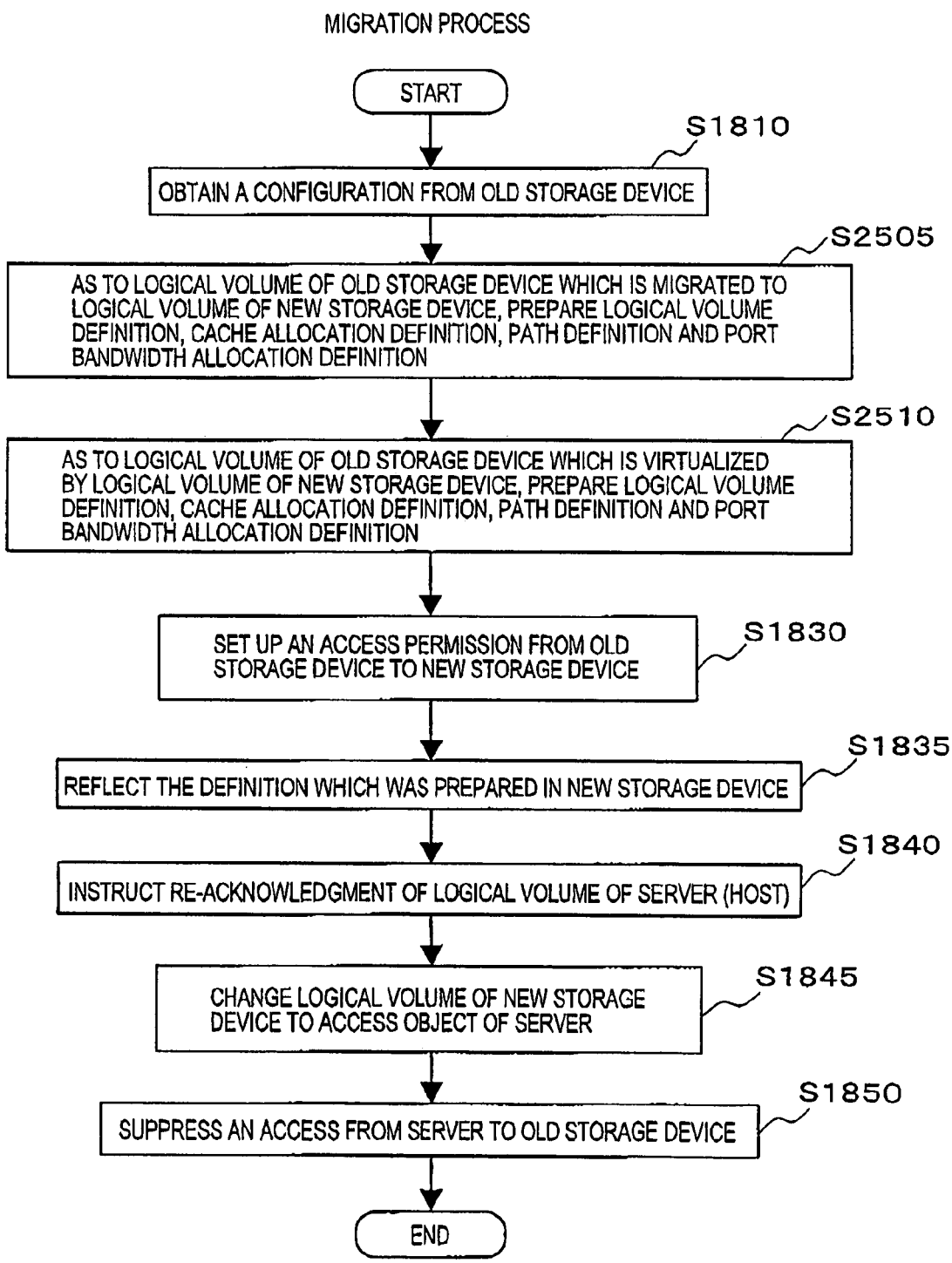
FIG. 25 is a flow chart for explaining a migration process that a device in which the migration manager PG 4345 is installed carries out, in case of migrating a part of a logical volume of the old storage device 5000 to the new storage device 4000, and of migrating, as to other part of the logical volume of the old storage device 5000, such a mode that the server 2000 accesses directly to the logical volume, to such a mode that it accesses to the logical volume through a virtual volume of the virtualization device 9000 in the third embodiment of the present invention.

FIG. 25 is a flow chart for explaining a migration process that the device in which the migration manager PG 4345 is installed carries out, in case of migrating from such a mode that a part of a logical volume of the old storage device 5000 is migrated to the new storage device 4000, and the server 2000 directly accesses to another part of the logical volume of the old storage device 5000, to such a mode that the logical volume is accessed through a virtual volume of the virtualization device 9000 in the third embodiment of the invention.

As shown in the figure, a different point between a migration process of this embodiment and the migration process of the first embodiment shown in FIG. 18 is as follows; the steps S2505, S2510 are carried out, instead of the steps S1815, 1820, 1825.

In the step S2505, the CPU 9100 of the virtualization device 9000 carries out logical volume definition preparation, cache allocation definition preparation, path definition and port bandwidth allocation definition of a logical volume of the virtualization device 9000 which is a migration destination, to each logical volume of the old storage device 5000, which is migrated to a logical volume of the virtualization device 9000. Also, in the step S2510, the CPU 9100 of the virtualization device 9000 carries out logical volume definition preparation, cache allocation definition preparation, path definition and port bandwidth allocation definition preparation of a logical volume of the virtualization device 9000, which is a virtual volume, to each logical volume of the old storage device 5000, virtualized by a logical volume (virtual volume) of the virtualization device 9000 by using the volume virtualization PG 4380. In addition, such a matter that which logical volume of the old storage device 5000 is migrated to which logical volume of the virtualization device 9000, and which logical volume of the old storage device 5000 is virtualized by a logical volume of the virtualization device 9000, and so on, may be set up, for example, in the virtualization device 9000 in advance, by a system administrator of the computer system using the management terminal 1000.

In addition, a logical volume definition preparation process carried out in the steps S2505, 2510 is basically the same steps carried out in the step S1815 of FIG. 18. Also, a cache allocation definition preparation process, a path definition and port bandwidth allocation definition preparation process are basically the same as the cache allocation definition preparation process shown in FIG. 19, and the path definition and port bandwidth allocation definition preparation process shown in FIG. 20. However, in this embodiment, a logical volume of a migration destination becomes a logical volume of the virtualization device 9000. Also, as a logical volume of a migration source, in the step S2505, a partial logical volume of the old storage device 5000 is targeted, and in S2510, a partial logical volume of the old storage device 5000, which is virtualized by a logical volume of the virtualization device 9000, is targeted.

In this embodiment, such a definition that it is judged that takeover to the virtualization device 9000 which is a migration destination is impossible may be set up again as a definition of the old storage device 5000 which is a migration source, without any modification. If this is done, in case that the cache allocation function and the port bandwidth allocation function are not applicable to the virtualization device 9000, it is possible to continuously use the cache allocation function and the port bandwidth allocation function of the old storage device 5000. In short, it becomes possible to continuously utilize various definition setups for improving performances defined by a system administrator of a computer system. In this manner, according to this embodiment, even in case of newly introducing the virtualization device 9000, by the migration process by the migration manager PG 4345, it is possible to carry out a setup which considered resource distribution of the virtualization device 9000 and the old storage device 5000, without compelling complicated works to a system administrator of a computer system.

Figure 26:
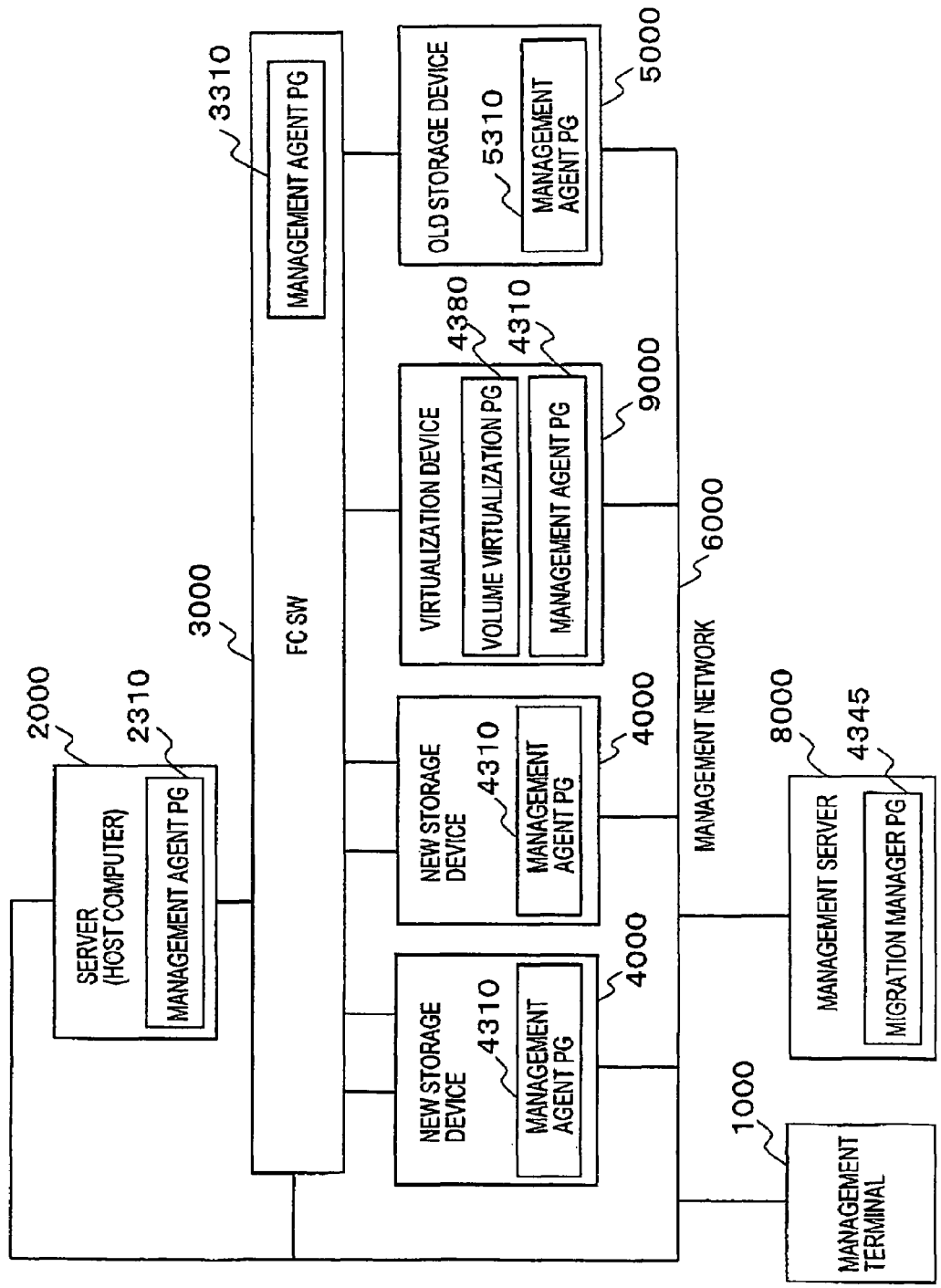
FIG. 26 is an another example of the computer system to which the third embodiment of the present invention is applied.

In addition, in this embodiment, such a case that a device in which the migration manager PG 4345 is installed is the virtualization device 9000 is described as an example. However, in the same manner as a difference between the above-described first and second embodiments, as a device in which the migration manager PG 4345 is installed, the management server 8000 may be disposed separately from the virtualization device 9000. In this case, even a configuration in which the old storage device 5000, the new storage device 4000 and the virtualization device 9000 are disposed in a mixed manner as shown in FIG. 26 (in this regard, the new storage device 4000 and the virtualization device 9000 are not ones in which the migration manager PG 4345 is installed.) can realize takeover of various setups for performance improvement due to the migration process. In this manner, by carrying out the migration process by the migration manager PG 4345 on the management server 8000, it is possible to realize central control of various setups used for takeover of performances in the computer system.

As above, each embodiment of the present invention has been described.

According to each embodiment of the present invention, by the migration process of the migration manager PG 4345, on the occasion of newly introducing the new storage device 4000, it is possible to take over various setups used to improve performances set up in a logical volume of the old storage device 5000 to a logical volume of the new storage device 4000 without compelling complicated works to a system administrator. By this, it is possible to reduce a management cost which required sophisticated knowledge and enormous time to each storage device, such as a matter that a system administrator carries out a takeover work of a setup every all logical volume. Also, even in case of newly introducing the virtualization device 9000, by the migration process of the migration manager PG 4345, it is possible to carry out an optimum setup which considered a resource distribution of the virtualization device 9000 and the old storage device 5000, without compelling complicated works to a system administrator.

In addition, the present invention is not limited to the above-described each embodiment, and lots of modifications are possible within a scope of its substance. For example, in the above-described each embodiment, such a case that the Fibre Channel network is utilized as a storage area network was described as an example. However, the present invention is not limited to this. The present invention is applicable to various storage area networks.

What is claimed is:

1. A configuration management method in a computer system comprising a first storage device, a virtualization device which manages a logical volume of said first storage device by a virtual volume which is a virtual logical volume, and a server which can transmit an access request to said first storage device and said virtualization device through a network, for setting up a configuration in said virtualization device, comprising:

a first step for obtaining a configuration including a logical volume definition, which is set up in said first storage device;

a second step for preparing a logical volume definition of a virtual volume of said virtualization device which virtualizes a logical volume of said first storage device, on the basis of a logical volume definition which is included in the configuration obtained in said first step;

a third step for preparing a cache allocation definition of a virtual volume of said virtualization device which virtualizes a logical volume of said first storage device, in case that a cache allocation definition is included in the configuration obtained in said first step, on the basis of the cache allocation definition that said first storage device has and capacity of a cache that said virtualization device has;

a fourth step for preparing a port bandwidth allocation definition of a port that said virtualization device has, which is used for an access to a virtual volume of said virtualization device which virtualizes a logical volume of said first storage device, in case that a port bandwidth allocation definition is included in the configuration which was obtained in said first step, on the basis of the port bandwidth allocation definition that said first storage device has and bandwidth capacity of a port that said virtualization device has; and a fifth step for setting up the logical volume definition prepared in said second step, the cache allocation definition in case that the cache allocation definition is prepared in said third step, and the port bandwidth allocation definition in case that the port bandwidth allocation definition is prepared in said fourth step, in said virtualization device, as a configuration.

2. The configuration management method according to claim 1, wherein said third step for preparing a cache allocation definition of a virtual volume of said virtualization device, so as for a cache allocation amount of a virtual volume of said virtualization device which virtualizes a logical volume of said first storage device to become the same capacity as a cache allocation amount of a logical volume of said first storage device, in case that a cache allocation amount of a logical volume of said first storage device, which is specified by a cache allocation definition included in the configuration obtained in said first step is smaller than remaining capacity to which a logical volume is not allocated among total capacity of a cache that said virtualization device has.

3. The configuration management method according to claim 1, wherein said port bandwidth allocation definition of a port that said virtualization device has, which is used for an access to a virtual volume of said virtualization device which virtualizes a logical volume of said first storage device, so as for a port bandwidth allocation amount for an access to a logical volume of said virtualization device which virtualizes a logical volume of said first storage device to becomes the same capacity as a port bandwidth allocation amount for an access to a logical volume of said first storage device, in case that a port bandwidth allocation amount for an access to a logical volume of said first storage device, which is specified by a port bandwidth allocation definition included in the configuration obtained in said first step, is smaller than bandwidth remaining capacity which is not allocated to an access to a logical volume among total bandwidth capacity of a port that said virtualization device has.

4. The configuration management method according to claim 1, further comprising:

a sixth step for changing an access request object of said server from a logical volume of said first storage device to a virtual volume of said virtualization device which virtualizes the logical volume.

5. The configuration management method according to claim 4, further comprising:

a seventh step for changing an access control list of said first storage device, so as to reject an access request from said server.

6. A configuration management apparatus in a computer system comprising a first storage device, a virtualization device which manages a logical volume of said first storage device by a virtual volume which is a virtual logical volume, and a server which can transmit an access request to said first storage device and said virtualization device through a network, for setting sets up a configuration in said virtualization device, comprising:

a calculation device, and a storage subsystem, wherein said calculation device carries out a process which obtains a configuration including a logical volume definition, from said first storage device and stores it in said storage subsystem, a process which prepares a logical volume definition of a virtual volume of said virtualization device which virtualizes a logical volume of said first storage device, on the basis of a logical volume definition included in the configuration stored in said storage subsystem, a process which prepares a cache allocation definition of a virtual volume of said virtualization device which virtualizes a logical volume of said first storage device, in case that a cache allocation definition is included in the configuration which was stored in said storage subsystem, on the basis of the cache allocation definition that said first storage device has and capacity of a cache that said virtualization device has, a process which prepares a port bandwidth allocation definition of a port that said virtualization device has, which is used for an access to a virtual volume of said virtualization device which virtualizes a logical volume of said first storage device, in case that a port bandwidth allocation definition is included in the configuration stored in said storage subsystem, on the basis of the port bandwidth allocation definition that said first storage device has and bandwidth capacity of a port that said virtualization device has, and a process which sets up the prepared logical volume definition, the cache allocation definition in case that the cache allocation definition is prepared, and the port bandwidth allocation definition in case that the port bandwidth allocation definition is prepared, as a configuration of said virtualization device.

7. The configuration management apparatus according to claim 6, wherein said configuration management apparatus is built up on said virtualization device.

8. The configuration management apparatus according to claim 6 is connected to each device which configures said computer system through another network separated from said network.

9. A computer system comprising:

a first storage device;

a virtualization device which unifies the management of a logical volume of said first storage device by a virtual volume which is a virtual logical volume;

a server which can transmit an access request to said first storage device and said virtualization device through a network; and a configuration management apparatus which sets up a configuration in said virtualization device, wherein said configuration management apparatus has a calculation device, and a storage subsystem, wherein said calculation device carries out a process which obtains a configuration including a logical volume definition, from said first storage device and stores it in said storage subsystem, a process which prepares a logical volume definition of a virtual volume of said virtualization device which virtualizes a logical volume of said first storage device, on the basis of a logical volume definition which is included in the configuration which was stored in said storage subsystem, a process which prepares a cache allocation definition of a virtual volume of said virtualization device which virtualizes a logical volume of said first storage device, in case that a cache allocation definition is included in the configuration stored in said storage subsystem, on the basis of the cache allocation definition that said first storage device has and capacity of a cache that said virtualization device has, a process which prepares a port bandwidth allocation definition of a port that said virtualization device has, which is used for an access to a virtual volume of said virtualization device which virtualizes a logical volume of said first storage device, in case that a port bandwidth allocation definition is included in the configuration which was stored in said storage subsystem, on the basis of the port bandwidth allocation definition that said first storage device has and bandwidth capacity of a port that said virtualization device has, and a process which sets up the prepared logical volume definition, the cache allocation definition in case that the cache allocation definition is prepared, and the port bandwidth allocation definition in case that the port bandwidth allocation definition is prepared, as a configuration of said virtualization device.

10. A computer-readable recording medium in a computer system comprising a first storage device, a virtualization device which manages a logical volume of said first storage device by a virtual volume which is a virtual logical volume, and a server which can transmit an access request to said first storage device and said virtualization device through a network, stores a program which is used to set up a configuration in said virtualization device, storing a program which has a computer executed:
- a first step for obtaining a configuration including a logical volume definition, which is set up in said first storage device,
- a second step for preparing a logical volume definition of a virtual volume of said virtualization device which virtualizes a logical volume of said first storage device, on the basis of a logical volume definition which is included in the configuration obtained in said first step,
- a third step for preparing a cache allocation definition of a virtual volume of said virtualization device which virtualizes a logical volume of said first storage device, in case that a cache allocation definition is included in the configuration obtained in said first step, on the basis of the cache allocation definition that said first storage device has and capacity of a cache that said virtualization device has,
- a fourth step for preparing a port bandwidth allocation definition of a port that said virtualization device has, which is used for an access to a virtual volume of said virtualization device which virtualizes a logical volume of said first storage device, in case that a port bandwidth allocation definition is included in the configuration which was obtained in said first step, on the basis of the port bandwidth allocation definition that said first storage device has and bandwidth capacity of a port that said virtualization device has, and
- a fifth step for setting up the logical volume definition which was prepared in said second step, the cache allocation definition in case that the cache allocation definition is prepared in said third step, and the port bandwidth allocation definition in case that the port bandwidth allocation definition is prepared in said fourth step, in said virtualization device, as a configuration.

* * * * *